US012094020B1

(12) United States Patent
Morten

(10) Patent No.: US 12,094,020 B1
(45) Date of Patent: Sep. 17, 2024

(54) MEDIA LICENSING PLATFORM

(71) Applicant: Official Technologies, Inc., Seattle, WA (US)

(72) Inventor: Glenn Alan Morten, Scottsdale, AZ (US)

(73) Assignee: Official Technologies, Inc., Seattle, WA (US)

(*) Notice: Subject to any disclaimer, the term of this patent is extended or adjusted under 35 U.S.C. 154(b) by 0 days.

(21) Appl. No.: 18/413,616

(22) Filed: Jan. 16, 2024

(51) Int. Cl.
*G06Q 50/18* (2012.01)
*G06F 16/783* (2019.01)
*H04N 21/8358* (2011.01)

(52) U.S. Cl.
CPC ......... *G06Q 50/184* (2013.01); *G06F 16/783* (2019.01); *H04N 21/8358* (2013.01); *G06Q 2220/18* (2013.01)

(58) Field of Classification Search
CPC . G06Q 50/184; G06Q 2220/18; G06F 16/783
See application file for complete search history.

(56) References Cited

U.S. PATENT DOCUMENTS

| | | | | |
|---|---|---|---|---|
| 2014/0283123 A1* | 9/2014 | Lonstein | ................. | H04L 63/10 726/28 |
| 2020/0176117 A1* | 6/2020 | Lee | ....................... | G06F 18/241 |
| 2021/0357451 A1* | 11/2021 | Wold | ...................... | G06F 16/68 |
| 2022/0027407 A1* | 1/2022 | Ikezoye | ................ | G06F 16/637 |
| 2023/0244710 A1* | 8/2023 | Wold | ...................... | G06F 16/65 707/736 |

OTHER PUBLICATIONS

"How AI and Machine Learning Revolutionize Software License Management" (Year: 2023).*
AI and Copyright protection in the Music Industry (Year: 2023).*

* cited by examiner

*Primary Examiner* — Dennis W Ruhl
(74) *Attorney, Agent, or Firm* — John W. Branch; Branch Partners PLLC

(57) ABSTRACT

Embodiments are directed to managing media licenses. Recognition models may be employed to determine media content that includes protected content. Compliance models may be employed to evaluate the media content based on licensing rules for the protected content. Results of the evaluation may be employed to perform further actions, including: identifying portions of the protected content for the media content that may be non-compliant with the licensing rules such that information associated with the non-compliance of the media content maybe provided to a creator or a rights holder of the media content; retraining the compliance models based on metrics associated with interactions by the creator or the rights holder with the media content or the results of the evaluation; employing the retrained compliance models to reevaluate the media content for compliance such that the reevaluated media content that is compliant is granted a media license.

30 Claims, 10 Drawing Sheets

MEDIA LICENSING PLATFORM

TECHNICAL FIELD

These innovations relate generally to data management, and more particularly, but not exclusively, to media licensing platforms.

BACKGROUND

Content creators, advertising agencies, marketing agencies, or the like, often generate media that may include representations of personalities, trademarks, brands, or other content that may be subject to copyright, trademark protections, personality rights, or the like. Also, personalities or other rights holders have an interest in protecting their protected assets from dilutions, misrepresentation, undesirable associations, or the like. Accordingly, conventionally creators or agencies that employ protected content may spend significant effort to obtain rights or licenses to protected content for use in their projects. Similarly, in some cases, rights holders may expend significant effort reviewing proposed uses, monitoring media, validating/verifying license compliance, or the like. However, the increasing use of modern media generation methods or media distribution (e.g., social media) may increase the need for license obtainment or license validation such that conventional rights clearance or license management processes may be overwhelmed. Also, in some cases, the use of generative artificial intelligence for generating media may result in a pronounced increase in the number of opportunities to generate media that includes protected content. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
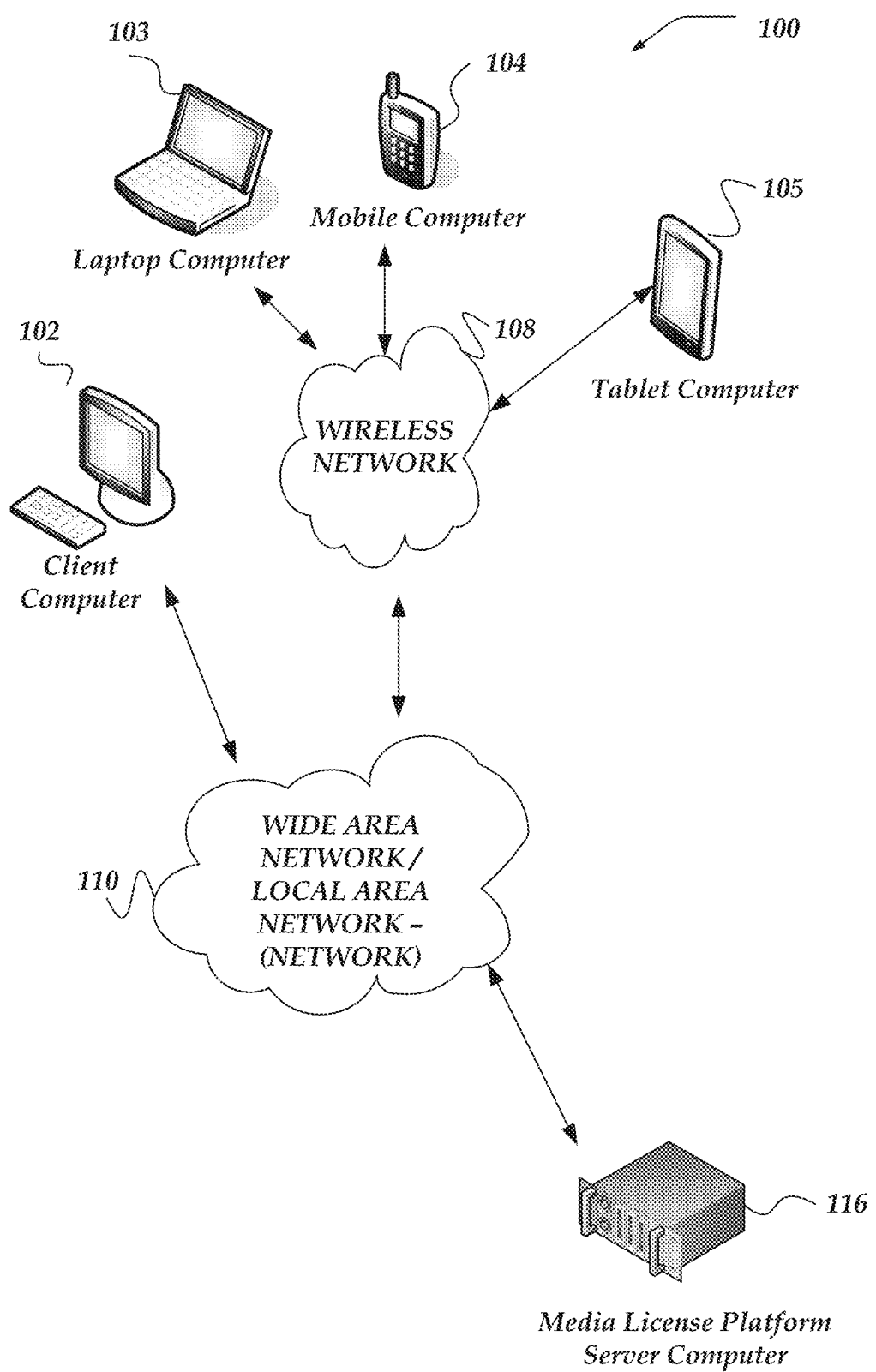
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of these innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java, PHP, Perl, Python, R, Julia, JavaScript, Ruby, VBScript, Microsoft .NET languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable mediums or computer storage devices and be stored on and executed by one or more general purpose computers, thus creating a special purpose computer configured to provide the engine.

As used herein, the terms "large language model," or "LLM" refer to data structures, programs, or the like, that may be trained or designed to perform a variety of natural language processing tasks. Typically, LLMs may generate text responses in response to text based prompts. Often, LLMs may be considered to be neural networks that have been trained on large collections of natural language source documents. Accordingly, in some cases, LLMs may be trained to generate predictive responses based on provided prompts. LLM prompts may include context information, examples, or the like, that may enable LLMs to generate responses directed to specific queries or particular problems that go beyond conventional NLP.

As used herein, the term "prompt" refers to one or more data structures that contain or represent prompt information that may be provided to LLMs.

As used herein, the term "media content" refers to instances or sources of content that may include one or more of a video, an image, a graphic, a design, an illustration, a picture, text, a sculpture, a performance, choreography, software, audio, or the like. Also, one or more representations of the media content may be submitted to one or more media license platforms for evaluations or licensing.

As used herein, the term "protected content" refers to one or more portions of the media content that is protected by one or more rights that may include a copyright, a trademark, a patent, a trade dress right, a design patent, an intellectual property right, a shop right, a moral right, a contract right, or the like. The protected content may include portions of original works, derivative works combinations of works, works generated solely, or in part, by persons, artificial intelligence systems, or the like.

As used herein, the term "licensed media content" refers to media content having one or more portions that are authorized to include protected content. Licensed media content may be associated with one or more licenses from one or more rights holders that hold claims to the protected content.

As used herein, the term "creator" refers to persons, systems, or organizations that generate media content that may include one or more portions of protected content.

As used herein, the term "rights holder" refers to persons or organizations that control one or all claims to the protected content.

As used herein, the term "recognition model" refers to one or more data structures that include machine learning based models that may be arranged to predict when protected content may be included in the media content. There may be different types of recognition models that may be based on different types of machine learning. Likewise, in one or more embodiments, different recognition models may be arranged for identifying protected content based on different criteria, in different media formats, different usages, different time frames, different purposes, or the like. In some cases, recognition models may include one or more of heuristics, filters, or the like, that work in conjunction with one or more machine learning models or sub-models.

As used herein, the term "compliance model" refers to one or more data structures that include machine learning based models that may be arranged to predict if submitted media content that includes protected content may comply with the license rules that are associated with the protected content. In some cases, there may be different types of compliance models that may be based on different types of machine learning. Likewise, in some embodiments, different compliance models may be arranged for evaluating license rule compliance based on different criteria, in different media formats, different usages, different time frames, different purposes, or the like. In some cases, compliance models may include one or more heuristics, filters, or the like, that work in conjunction with one or more machine learning models or sub-models.

As used herein, the term, "configuration information" refers to information that may include rule based policies, pattern matching, scripts, computer readable instructions, or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of these innovations to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing media licenses. In one or more of the various embodiments, one or more recognition models may be employed to determine media content that includes one or more portions of protected content.

In one or more of the various embodiments, one or more compliance models may be employed to evaluate the media content based on one or more licensing rules for the one or more portions of the protected content.

In one or more of the various embodiments, one or more results of the evaluation may be employed to perform further actions, including: identifying one or more portions of the protected content for the media content that may be non-compliant with the one or more licensing rules such that information associated with the non-compliance of the media content maybe provided to one or more of a creator or a rights holder of the media content; retraining the one or more of the compliance models based on metrics associated with one or more interactions by the one or more of the creator or the rights holder with the media content or the one or more results of the evaluation; employing the one or more retrained compliance models to reevaluate the media content for compliance such that the reevaluated media content that may be compliant may be granted a media license; or the like.

In one or more of the various embodiments, the media content may be approved based on compliance with the one or more licensing rules. In some embodiments, security signature information may be generated based on one or more characteristics of the media content. In some embodiments, the security signature information may be embedded in the media content based on the one or more licensing rules.

In one or more of the various embodiments, one or more distribution networks associated with the licensed media content may be determined. In some embodiments, the licensed media content may be provided to the one or more distribution networks. In some embodiments, usage of the licensed media content within the one or more distribution networks may be monitored.

In one or more of the various embodiments, query information may be determined based on creator interactions with a creator gateway. In some embodiments, the query information may be employed to search for other protected content based on the query information. In some embodiments, an interactive report may be generated to display the other protected content and one or more other licensing rules that may be associated with the other protected content.

In one or more of the various embodiments, one or more collections of authorized media assets that are associated with the protected content may be determined. In one or more of the various embodiments, one or more creators may be enabled to access the one or more collections of authorized media assets.

In one or more of the various embodiments, the one or more metrics associated with the one or more compliance models may be determined such that the one or more metrics may include a number of times the one or more rights holders indicate disagreement with one or more compliance predictions made by a compliance model. In one or more of the various embodiments, the portion of the one or more compliance models for retraining may be determined based on the one or more metrics such that the portion of the one or more compliance models may be determined for retraining may be associated with the one or more metrics that may be below a threshold value.

In one or more of the various embodiments, security signature information associated with the media content may be determined such that the security signature information may be provided by one or more of a user, a distribution network, the creator, the rights holder, or the like. In one or more of the various embodiments, one or more security signature records may be determined based on the security signature information. In one or more of the various embodiments, the determined security signature information may be validated that it corresponds to the one or more security signature records. In one or more of the various embodiments, one or more reports may be generated based on one or more results of the validation such that the one or more reports may be provided to one or more of the user, the creator, the distribution network, the rights holder, or the like.

In one or more of the various embodiments, retraining the one or more compliance models may include: determining one or more deficiencies in the one or more compliance models based on the one more metrics; determining a portion of the one or more recognition models that may be associated with the one or more deficiencies; retraining the portion of one or more recognition models based on one or more of the one or more compliance models or the one or more retrained compliance models; or the like.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)-(network) 110, wireless network 108, client computers 102-105, media licensing platform server computer 116, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, media licensing platform server computer 116, or other computers.

Client computers 102-105 may further be configured to include a client application that enables an end-user to log into an end-user account that may be managed by another computer, such as media licensing platform server computer 116, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to media licensing platform server computer 116. Also, client computers may be arranged to enable users to display reports, interactive user-interfaces, results provided by media license platform server computer 116, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, licensing platform server computer 116, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanisms and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of media licensing platform server computer 116 is described in more detail below in conjunction with FIG. 3. Although FIG. 1 illustrates media licensing platform server computer 116 as a single computer, the innovations or embodiments are not so limited. For example, one or more functions of media licensing platform server computer 116, or the like, may be distributed across one or more distinct network computers. Moreover, in one or more embodiments, media licensing platform server computer 116 may be implemented using a plurality of network computers. Further, in one or more of the various embodiments, media licensing platform server computer 116 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
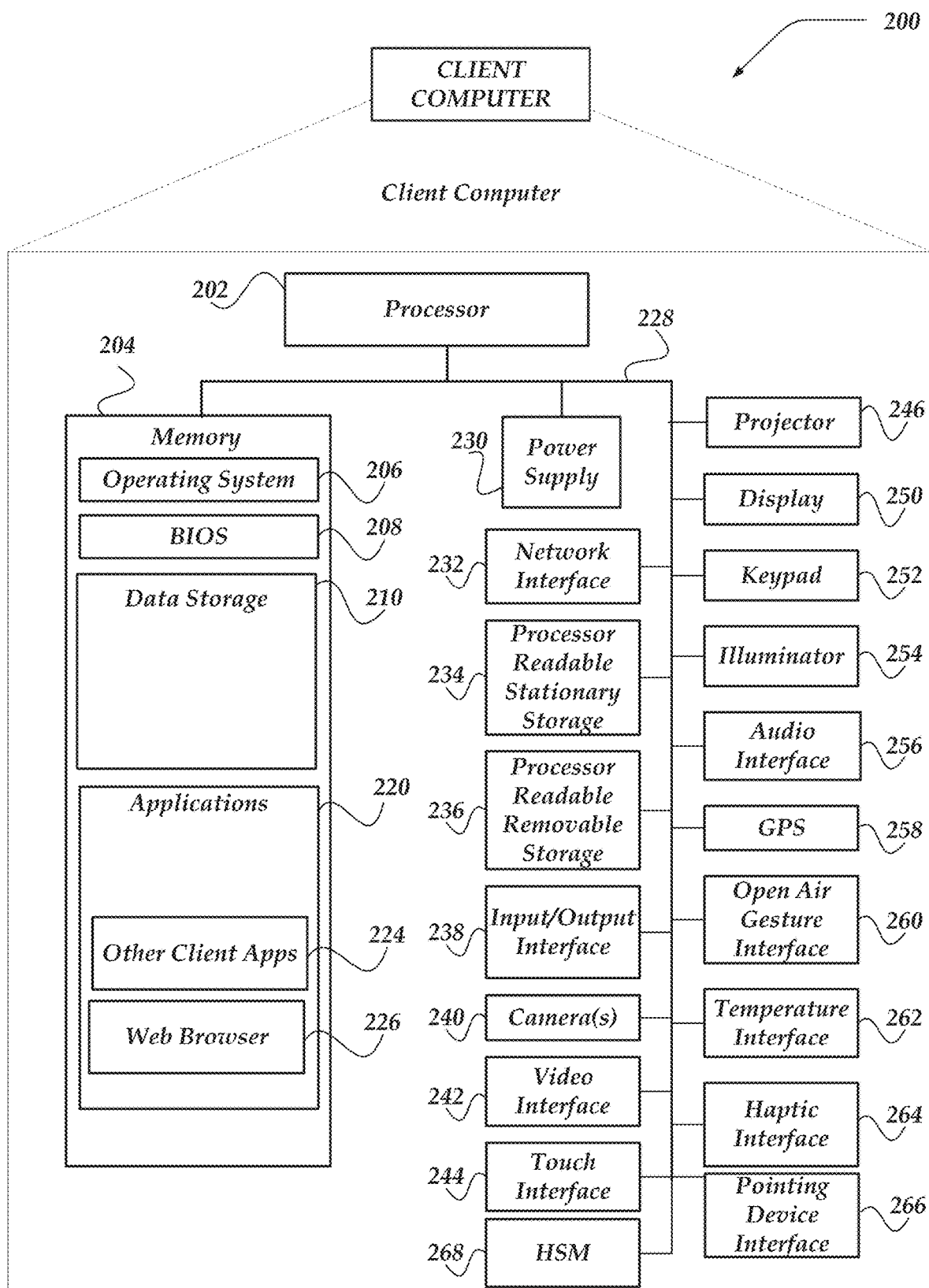
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth, Zigbee, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

Figure 3:
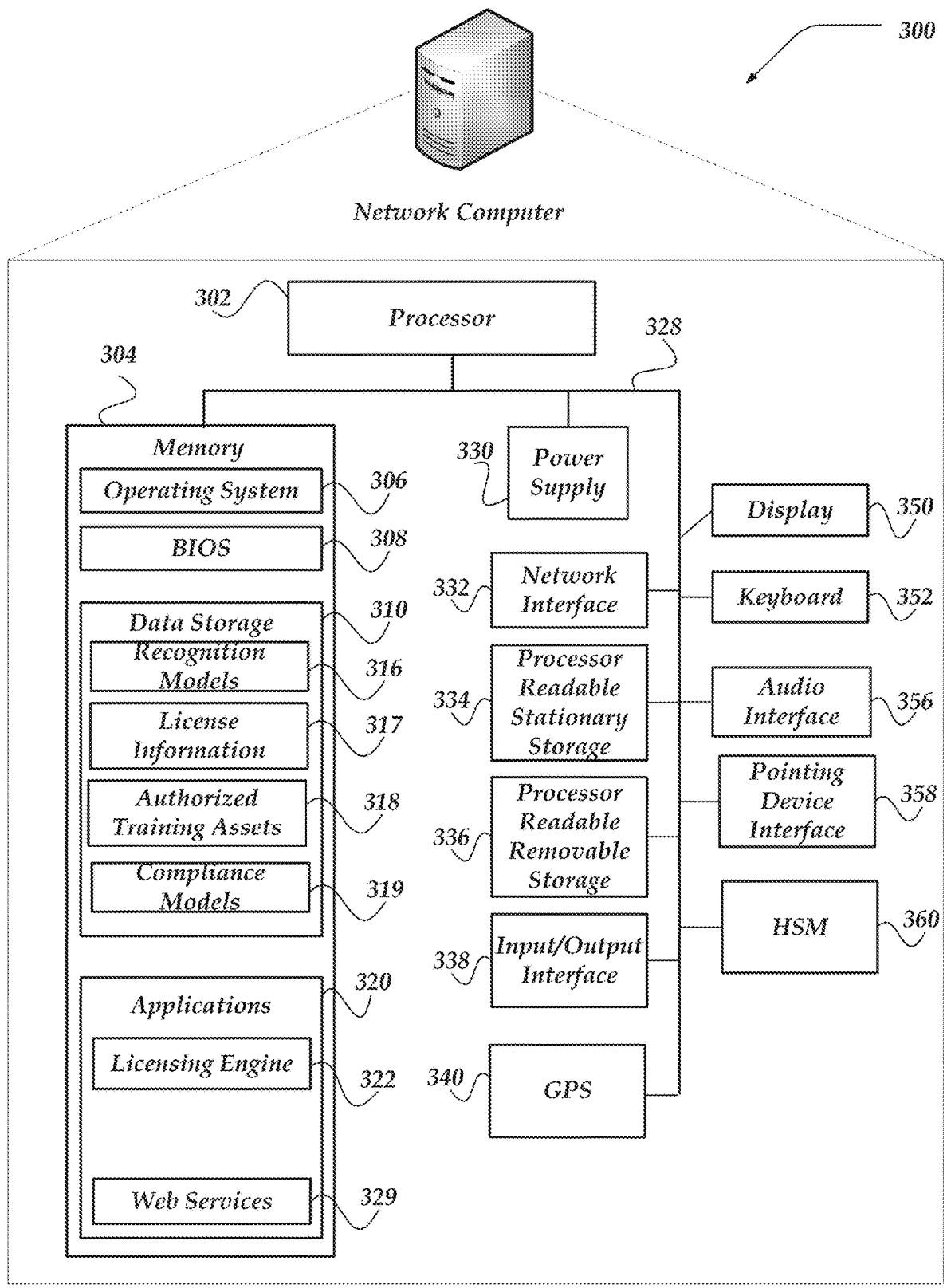
FIG. 3 illustrates a schematic embodiment of a network computer.

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of media licensing platform server computer 116 shown in FIG. 1.

As shown in the figure, network computer 300 includes a processor 302 that may be in communication with a memory 304 via a bus 328. In some embodiments, processor 302 may be composed of one or more hardware processors, or one or more processor cores. In some cases, one or more of the one or more processors may be specialized processors designed to perform one or more specialized actions, such as those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the network computer or client computers, including for example, a Media Access Control (MAC) address, IP address, and the like.

In at least one of the various embodiments, applications, such as, operating system 306, licensing engine 322, web services 329, or the like, may be arranged to employ geo-location information to select one or more localization features, such as, time zones, languages, currencies, calendar formatting, or the like. Also, localization features may be used when interpreting network traffic, application protocols, user-interfaces, generating reports, selecting license rules for in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, recognition models 316, license information 317, authorized training assets 318, compliance models 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include licensing engine 322, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, licensing engine 322, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to licensing engine 322, web services 329, or the like, may be provisioned and de-commissioned automatically.

Also, in one or more of the various embodiments, licensing engine 322, web services 329, or the like, may be located in one or more network computers or virtual computers rather than being tied to one or more specific physical network computers. Likewise, in some embodiments, one or more of licensing engine 322, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
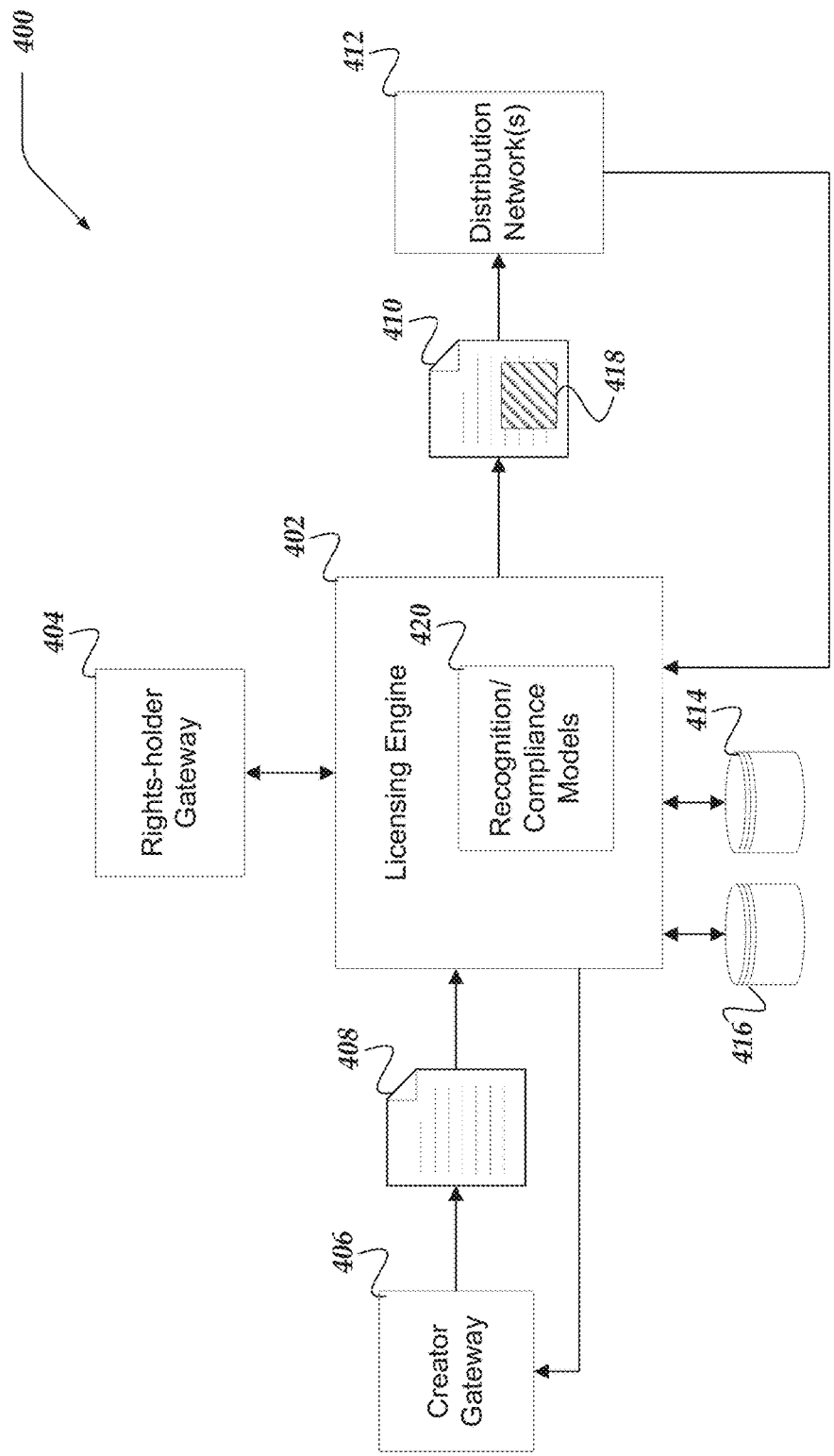
FIG. 4 illustrates a logical architecture of a system for media licensing platform in accordance with one or more of the various embodiments.

FIG. 4 illustrates a logical architecture of system 400 for media licensing platform in accordance with one or more of the various embodiments. In some embodiments, media licensing platforms may be arranged to include one or more licensing engines, such as licensing engine 402. Also, in some embodiments, licensing platforms may be arranged to generate one or more gateways, such as: rights-holder gateways, such as rights-holder gateway 404; one or more creator gateways, such as creator gateway 406; or the like.

In some embodiments, users may be enabled to employ creator gateway 406 to, among other things, browse licensing opportunities, review licensing requirements/restrictions, accessed licensed machine-learning training data, submit candidate media for evaluation or approval, or the like. In this example, for some embodiment, media submission 408 may represent media being submitted for evaluation or approval.

Similarly, in some embodiments, rights-holders may be enabled to employ rights-holder gateway 404 to review media submissions, update licensing requirement/restrictions, review metrics associated with media licenses, submit or review machine-learning training data, or the like. In some embodiments, authorized media assets may be stored in data store, such as data store 414.

In some embodiments, creator gateways or rights-holder gateways may be applications or services provided by websites, mobile device applications, computer desktop applications, or the like. Accordingly, in some embodiments, creator gateways or rights-holder gateways may be arranged to establish cryptographically secured communication channels to licensing engines, such as licensing engine 402. Thus, in some embodiments, creator gateways or rights-holder gateways may provide secure interactive communication pathways for creators or rights holders for accessing media licensing platforms. Further, in some embodiments, creator gateways or rights-holder gateways may be provided via interfaces or APIs that enable authorized remote services to provide customer or third-party gateway applications for creators or rights holders.

Accordingly, in some embodiments, media licensing platforms may enable content creators and rights holders to execute interactive or iterative work flows that employ the media licensing platform as a go between for negotiating licenses or other agreements. Also, in some embodiments, rights holders may declare license requirements (license rules) associated with protected content. In some embodiments, licensing engines may be arranged to automatically evaluate submitted media content and automatically generate licenses for authorized uses of the media content. Thus, in some cases, media licensing platforms may enable content creators to create and distribute media with licensed content without requiring direct intervention by the rights holders.

In some embodiments, licensing engines may be arranged to maintain one or more data stores, such as data store 416 for storing licensing information. In some embodiments, licensing information may include structured data that declares one or more licensing rules for one or more rights holders. Also, in some embodiments, licensing information may include active licensing agreements or licensing contracts that may be associated with one or more rights holders or media content. In some embodiments, licensing information may be one or more structured records that include serial numbers, meta-data, key words, activation dates (if any), expiration dates (if any), security signature information, or the like. Accordingly, in some embodiments, licensing engines may be arranged to execute queries against the licensing information data store to generate various reports regarding various license agreements.

In some embodiments, if submitted media content may be approved for licensing, licensing engine 402 may be arranged to update the licensing information data store as necessary (e.g., recording that a license is approved or otherwise active).

Further, in some embodiments, licensing engines may be arranged to generate one or more security signatures that may be associated with the licensed media content. In some embodiments, licensing engines may be arranged to generate one or more security signatures that may be embedded in or associated with one or more visible watermarks that may be visible in the licensed media content for some users. Also, in some embodiments, licensing engines may be arranged to generate security signatures based on hash digests, frequency domain analysis, or the like, that may be regenerated from copies of the licensed media content that may be encountered. In some embodiments, licensing engines may be arranged to provide a security signature framework that enables one or more different types of security signatures to be generated for various circumstances or requirements. Accordingly, in some embodiments, licensing engines may be arranged to determine one or more particular security signatures or security signature generators based on configuration information to at least account for local circumstances or local requirements.

In some embodiments, licensing engines may be arranged to generate security signatures that embedded some license information directly with or into the security signature. Accordingly, in some embodiments, some licensing information may be immediately extracted from the security signature rather than requiring communication with the media licensing platform. For example, in some embodiments, a security signature may include a serial number, author/right-holders identity information, effective dates, expiration date, geographic restriction information, or the like.

Accordingly, in this example, for some embodiments, licensed media content 410 may represent media that may be prepared by licensing engine 402. Also, in this example, for some embodiments, security signature 418 may represent a security signature generated by licensing engine 402. Note, in this example, the security signature is represented as being visible to users. However, as noted herein, in some cases, security signatures may be hidden in the licensed media content or otherwise invisible to one or more users.

In some embodiments, licensing engines may be arranged to submit the licensed media content, such as licensed media content 410 to one or more content distribution networks, such as distribution network(s) 412. Also, in some embodiments, licensing engines may enable content creators to selectively or manually include licensed media content in one or more media properties. In some embodiments, licensing engines may be arranged to integrate with one or more distribution networks using interfaces or APIs provided by distribution networks. For example, if a rights holder authorizes licensed media content, licensing engines may be arranged to automatically publish licensed media content to one or more distribution networks as directed/configured by the content creator or otherwise authorized by agreed upon license rules.

In some embodiments, rights holders may include restrictions or qualifications regarding which distribution networks may be provided the licensed media content. Accordingly, in some embodiments, licensing rules for the licensed media content may include information for selecting which distribution networks may be allowed.

In some embodiments, licensing engines may enable one or more distribution networks to validate or confirm the license status of licensed media content that may be distributed in their networks. For example, in some embodiments, distribution networks may be enabled to employ one or more interfaces or APIs provided by licensing engines to discover or evaluate licensed media content. Accordingly, in some embodiments, distribution networks may be enabled to dynamically or actively confirm or validate licensed media content that comes through their networks. For example, a distribution network may be configured to employ one or more media licensing platform APIs to identify security signatures in licensed media content such that security signature may be provided to the media licensing platform to validate the license for the licensed media content.

Also, in some embodiments, licensing engines may be arranged to provide one or more other APIs that enable distribution networks to submit one or more metrics associated with licensed media content that may be used in the distribution networks. For example, in some embodiments, distribution networks may be enabled to submit distribution metrics such as view count, target/destination client information, or the like. Similarly, in some embodiments, media licensing platforms may be arranged to provide one or more interfaces or APIs that enable distribution networks to report media irregularities, license violations, or the like. For example, in some embodiments, distribution networks may be enabled to report if media may be associated with expired security signatures, counterfeit security signatures, or the like. Further, in some embodiments, distribution networks may be enabled to confirm that the media content conforms to the authorized license. For example, if the license requires the licensed media content to be displayed/played using particular media formats, display/resolution quality, or the like, the distribution networks may be enabled to report such discrepancies the media licensing platform.

Also, in some embodiments, users that encounter licensed media content while viewing media may be enabled to personally review or validate the license terms associated with the licensed media content. Accordingly, in some embodiments, content users may be enabled to validate if the media they may be viewing or consuming is authorized content that conforms to the rights holders requirements. For example, in some embodiments, media players or viewers may be configured to include plugins, extensions, or the like, that automatically examine media content to extract security signatures if they may be available. Accordingly, in some embodiments, the media player may employ interfaces of APIs from licensing engines to verify the license terms for the licensed media content. Likewise, in some embodiments, media users may be provided a report that indicates how the licensed media content may be used or distributed by individual users.

Also, in some embodiments, rights holders may encounter licensed media content as provided by distribution networks, or otherwise used in media properties. Accordingly, in some embodiments, rights holders may be enabled to employ media player plug-ins or extensions that confirm that their licensed media content is being used in accordance with its license.

Further, in some embodiments, licensing engines may be arranged to include one or more recognition models or one or more compliance models such as recognition models/compliance models 420.

In some embodiments, recognition models may be arranged to evaluate submitted media content to identify protected content that may be included in submitted media. In some embodiments, recognition models may be arranged to identify general subjects, such as persons or faces to enable users to personally review the portions of the media content that may include the identified subject matter. Also, in some embodiments, recognition models may be arranged to identify particular persons or other protected content that may be included in media content. Accordingly, in some embodiments, creators may be informed that their media content includes protected content that should be licensed. Similarly, rights holders may be informed that submitted media content may include their protected content. Thus, in some embodiments, rights holders may be configured licensing engines to automatically initiate one or more licensing actions associated with their protected content. In some embodiments, recognition models may be configured to generate a recognition confidence score based on the quality of the predicted recognition.

Also, in some embodiments, compliance models may be arranged to evaluate if submitted media content complies with the one or more license rules that may be associated with protected content included in the submitted media content. In some embodiments, licensing engines may be arranged to include one or more generic compliance models that are directed to general identification of potential license rule violations. For example, if protected content is associated with license rule that restricts a personality from being depicted as smoking, a generalized compliance model may be trained to predict if content includes images or representations of smoking or smokers.

Further, in some embodiments, licensing engines may include customized compliance models that inspect media content for compliance with specific or unique license rules. Accordingly, in some embodiments, licensing engines may be arranged to enable compliance models to be added to the media licensing platforms or otherwise associated with particular rights holders or protected content.

In some embodiments, recognition models or compliance models may be arranged to access external or third-party machine learning systems or generative artificial intelligence systems. Further, in some embodiments, recognition models or compliance models may be comprised of heuristics, rules, machine vision instructions, machine-learning classifiers, or the like that may be used for recognizing protected content or evaluating license rule compliance. Accordingly, in some embodiments, licensing engines may be arranged to include recognition models or compliance models based on configuration information.

In one or more of the various embodiments, one or more recognition models may be associated with one or more compliance models. Accordingly, in some embodiments, one or more recognition models may be trained to determine particular protected content that one or more particular compliance models may be directed to evaluating. For example, in some embodiments, particular recognition models may be arranged to identify facial features of particular personalities while one or more associated compliance models may be arranged to evaluate if the protected content that includes those facial features complies with one or more particular license rules. Thus, in some cases, for some embodiments, one or more licensing rules may be associated with one or more compliance models as well as one or more recognition models.

Generalized Operations

FIGS. 5-10 represent generalized operations for media licensing platforms in accordance with one or more of the various embodiments. In one or more of the various embodiments, processes 500, 600, 700, 800, 900, or 1000 described in conjunction with FIGS. 5-10 may be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environments. However, embodiments are not so limited and various combinations of network computers, client computers, or the like may be utilized. Further, in one or more of the various embodiments, the processes described in conjunction with FIGS. 5-10 may be used for media licensing platforms in accordance with at least one of the various embodiments or architectures such as those described in conjunction with FIGS. 1-4. Further, in one or more of the various embodiments, some or all of the actions performed by processes 500, 600, 700, 800, 900, or 1000 may be executed in part by licensing engine 322, or the like, running on one or more processors of one or more network computers.

Figure 5:
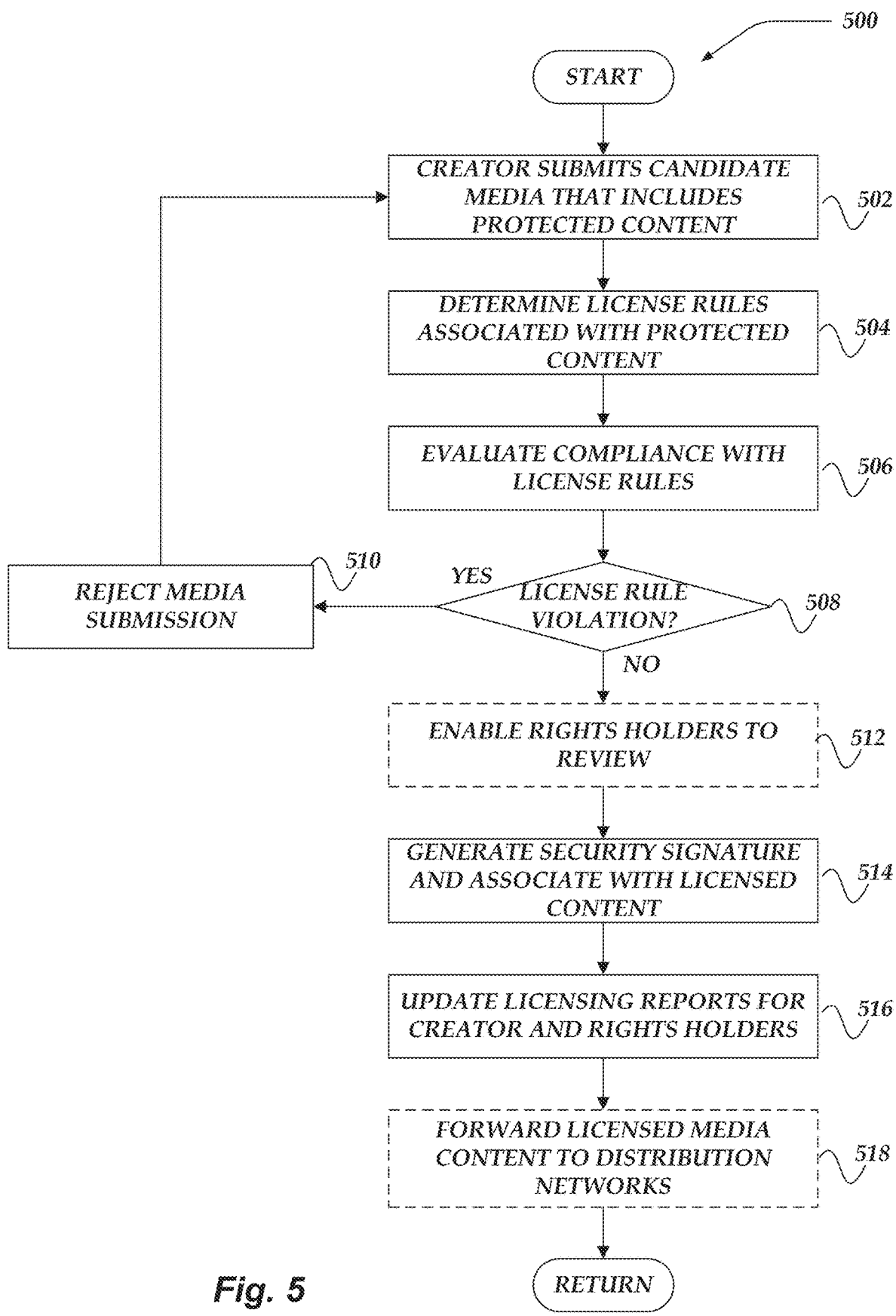
FIG. 5 illustrates an overview flowchart of a process for media licensing platforms in accordance with one or more of the various embodiments.

FIG. 5 illustrates an overview flowchart of process 500 for media licensing platforms in accordance with one or more of the various embodiments. After a start block, at block 502, in one or more of the various embodiments, creators may submit candidate media that may include protected content.

In one or more of the various embodiments, media licensing platforms may be arranged to provide one or more creator gateways that enable media creators (or their agents) to upload media content that may include protected content. In some embodiments, media content may include videos, images, graphic art, audio, music, choreography, or the like. Also, in some cases, for some embodiments, media content may include print or print-ready media.

In some embodiments, protected content may be content included in the submitted media that one or more rights holders has partial interest or controlling interest with respect the use of the protected content. Accordingly, in some embodiments, protected content may include various representations of brands, trademarks, or the like. Further, in some embodiments, protected content may include representations of personalities, copyrighted content, or the like.

In some embodiments, the submitted media content may be partially or wholly generated based on generative artificial intelligence services. Accordingly, in some embodiments, the protected content included in the submitted media may be generated without requiring direct interaction with the personalities, products, or the like, comprising the protected content. In some embodiments, the generative artificial intelligence employed for generating the submitted media may be provided by one or more generative artificial intelligence services external to the media licensing platform. In some cases, for some embodiments, the generative artificial intelligence services may be provided by third-party organizations rather than the creator. Also, in some embodiments, creators (or their agents) may employ private or locally trained generative artificial intelligence models to generate the protected content. For example, in some embodiments, media licensing platforms may enable creators to access authorized data/media that may be employed to train private or custom generative artificial intelligence models that may be used to generate the submitted media.

In some embodiments, licensing engines may be arranged to automatically evaluate submitted media content to determine if protected content may be included in the media content. Accordingly, in some embodiments, licensing engines may be arranged to employ one or more recognition models to identify uses of protected content that may be included in the submitted media content.

In some embodiments, recognition models may include one or more heuristics, machine-learning models, machine vision libraries, rules, or the like, for identifying protected content that may be included in the submitted media content. Accordingly, in some embodiments, licensing engines may be arranged to generate interactive reports the indicate portions of the media content that may include protected content. In some embodiments, recognition models may be configured to identify protected content associated with particular rights holders, licensing rules, or compliance models. Accordingly, in some embodiments, some recognition models may be trained or tuned to identify particular persons, products, music, or the like that may be included in media content. For example, in some embodiments, licensing engines may be arranged to employ recognition models that are particularly trained to recognize images or videos that include representations of persons. Accordingly, in some embodiments, licensing engines may be arranged to generate interactive reports that enable creators that submit media content as well as rights holders to review particular portions of the media content that may include protected content.

At block 504, in one or more of the various embodiments, licensing engines may be arranged to determine one or more license rules that may be associated with the protected content included in the submitted media.

In some embodiments, licensing engines may be arranged to examine the submitted media to determine if the media includes protected content. Accordingly, in some embodiments, licensing engines may be arranged to employ one or more recognition models that may be trained to recognized protected media. In some embodiments, machine-learning models may include one or more generative artificial intelligence models. In some cases, the generative artificial intelligence models may include general purpose models (e.g., large language models) provided by third-parties. Also, in some embodiments, generative artificial intelligence models or other machine learning models may comprise one or more private or custom models trained using assets provided by or otherwise authorized for use by rights holders.

In some embodiments, licensing engines may be arranged to employ a library of recognition models that may include one or more of machine-learning models, generative artificial intelligence models, prompts, prompt templates, or the like that may be directed to recognizing images, video, or other graphical representations of the protected content. Accordingly, in some embodiments, licensing engines may be arranged to employ one or more machine-learning models that are trained to recognize graphical representations of personalities that rights holders have registered with the media licensing platform. Likewise, in some embodiments, licensing engines may be arranged to employ one or more other machine-learning models that are trained to recognize protected audio, text, trademarks, or the like, that may be included in submitted media. Also, in some embodiments, licensing engines may be arranged to employ one or more machine-learning models, large language models, generative artificial intelligence models, or the like to identify representations of audio that may be protected content included in the submitted media. Further, as introduced above, in some embodiments, one or more recognition models may be associated with particular compliance models or licensing rules.

Accordingly, in some embodiments, if licensing engines identify protected content associated with rights holders registered with the media licensing platform, the licensing engines may determine the associated license rules.

In one or more of the various embodiments, if rights holders register protected content with the media licensing platform, one or more license rules may be associated with the protected content. In some embodiments, licensing engines may be arranged to enable rights holders to selectively associate license rules with different protected content.

At block 506, in one or more of the various embodiments, licensing engines may be arranged to evaluate compliance with the determined license rules.

In some embodiments, some license rules may be associated with one or more compliance models that include computer executable instructions, filters, regular expressions, machine-learning classifiers, or the like, that may predict if submitted media violates those license rules. In some embodiments, compliance models may be arranged to associate confidence scores with license rule predictions/evaluations. Accordingly, in some embodiments, if a compliance model prediction confidence score exceeds a threshold value, the licensing engines may be enabled to automatically act on the prediction.

Also, in some embodiments, one or more other license rules may be configured to notify rights holders that a particular license rule may be implicated rather than predicting violations or compliance. For example, in some embodiments, a license rule may be arranged to identify portions of the submitted media that include protected content to enable rights holders to manually review those portions of the submitted media. Thus, in some embodiments, licensing engines may be arranged to enable rights holders to quickly identify or review portions of submitted content that may be relevant to particular license rules.

At decision block 508, in one or more of the various embodiments, if there may be license rule violations, control may flow to block 510; otherwise, control may flow to block 512. In some embodiments, licensing engines may be arranged to analytically determine some license rule violations. Likewise, in some embodiments, some license rule violations may be confirmed or indicated directly by rights holders reviewing submitted media via a rights holder gateway application.

Further, in some embodiments, licensing engines may be arranged to enable one or more compliance models to predict license rule violations. However, in some embodiments, some license rules may be configured to enable rights holders to confirm if predicted violations should be enforced. Accordingly, in some embodiments, licensing engines may provide user interfaces (e.g., rights holder gateway) that may enable rights holders to override particular analytically determined license rule violations.

At block 510, in one or more of the various embodiments, licensing engines may be arranged to reject the submitted media based on the license rule violation.

In some embodiments, licensing engines may be arranged to generate a rejection report for the submitted media based on the violated license rules. Further, in some embodiments, licensing engines may be arranged to provide one or more user interfaces (e.g., via the rights holder gateway) that enable rights holders to include additional information regarding the violation to provide feedback to creators. Thus, in some embodiments, the feedback provided by rights holders may enable creators to better understand how to modify the media content to increase the likelihood of gaining compliance.

Accordingly, in some embodiments, licensing engines may be arranged to generate one or more notifications directed to creators regarding rejected media submissions. In some embodiments, licensing engines may be arranged to employ user interfaces within creator gateways to display the rejection notifications. Also, in some embodiments, licensing engines may be arranged to employ other communication channels, such as, SMS texts, email, automated voice calls, or the like, for providing rejection notifications to creators.

Thus, in some embodiments, licensing engines may be arranged to enable creators to timely react to rejections to facilitate an interactive work-flow with the rights holders.

At block 512, in one or more of the various embodiments, optionally, licensing engines may be arranged to enable rights holders associated with the protected media to review the non-violating media.

As described above, in some embodiments, licensing engines may be arranged to provide rights holder gateways that include user interfaces that may enable rights holders (or their agents) to review activity associated with their protected content.

Also, in some embodiments, licensing engines may be arranged to enable license rules or particular protect content to be associated with a rule that may require a final confirmation by a rights holder before a candidate media content may be released as licensed media content. Accordingly, in some embodiments, licensing engines may be arranged to provide user interfaces or interactive reports via rights holder gateways, or the like, that list or display media that may be eligible for final approval. In some embodiments, media included in such lists may be considered to be a final state such that discovered or predicted license rule violations have been resolved. Note, in some embodiments, at least one improvement over convention systems provided by media licensing platforms may be enabling rapid automated approval and licensing of media content. However, in some cases, for some embodiments, some rights holders may consider some protected content important enough that media that includes such protected content may require a final approval before being released to the creator or otherwise distributed.

In some embodiments, one or more license rules may be configured to require final approval may be associated with particular brands, personalities, distribution networks, proposed uses (of the candidate media), or the like. Also, in some embodiments, one or more media publishers may be pre-approved for displaying particular types of media content. For example, rights holders may have prior experience or agreements with particular distribution networks such that media content designated for those distribution networks may be automatically approved while the same media content may require a final approval before it may be distributed in some other distribution networks.

Accordingly, in some embodiments, licensing engines or media licensing platforms may be arranged to enable rights holder reviewers to view the candidate media content in its final form before releasing the candidate media content.

In some embodiments, if the media content may be configured to include a visible watermark, licensing engines may be arranged to display or overlay a mock version of a watermark that may represent how the actual watermark would appear in the media content. Note, in some embodiments, this representative watermark may include information or markings that may notoriously or obviously indicate that the "watermark" is a mock up or otherwise does not represent a grant of rights or license to use the protected content included in the media.

Note, this block is indicated as being optional because in some cases for some embodiments licensing engines may be configured to automatically approved/review some license compliant media submissions rather than requiring the rights holders to explicitly make a final approval decision.

Further, in some embodiments, licensing engines may be arranged to collect one or more metrics associated with rights holders' interactions during review of the license. In some embodiments, metrics may include tracking how often rights holders agree or disagree with compliance predictions. Accordingly, in some embodiments, if metrics associated with unsuccessful predictions exceed a threshold value one or more compliance models (e.g., those associated with predictions rejected by rights holders) may be flagged for re-training. In some embodiments, licensing engines may be arranged to automatically re-training one or more compliance models based on metrics associated rights holders interactions.

In some embodiments, licensing engines may be arranged to enable rights holders to review compliance predictions and associated licensed media content at a later date. Accordingly, in some embodiments, licensing engines may generate interactive reports that enable rights-holders to evaluate if compliance models may be correctly evaluating media content. Thus, in some embodiments, even media content that may be automatically licenses absent rights holder intervention may be later reviewed. Accordingly, in some embodiments, metrics associated with the performance of compliance models may be collected at a later date.

In some embodiments, licensing engines may be arranged to employ one or more experimental compliance models such that compliance predictions made by experimental compliance models may be evaluated against other compliance models. Accordingly, in some embodiments, licensing engines may be arranged to promote experiment compliance models to production usage if the performance of the experimental compliance models is within a defined error range relative to other compliance models.

At block 514, in one or more of the various embodiments, licensing engines may be arranged to generate a security signature and associate it with the licensed media content. In some embodiments, licensing engines may be arranged to generate security signatures that associate various information, such as, rights holders, creators, agreed license rules, other agreements, effective dates, or the like, with licensed media content. In some embodiments, licensing engines may be arranged to associate a serial number with one or more records that may store some or all of the licensing information.

In some embodiments, licensing engines may be arranged to embed the security signature information in the media content such that the security signature information may be invisible to the naked eye. Accordingly, in some embodiments, licensing engines may employ one or more embedding methods directed to the particular type of media or media protocol being used for the media content. For example, in some embodiments, licensing engines may be arranged to transform security signature information into a signal that may be included in the media content via spread spectrum embedding that enables the security signature to be recovered from the media content using specialized recovery protocols. Note, one of ordinary skill in the art will appreciate that there may be various standards or embedding protocols that may be employed. In some embodiments, different rights holders or different creators may require particular embedding protocols to enable subsequent validation/verification. Accordingly, in some embodiments, licensing engines may be arranged to determine the particular security signature embedding process based on configuration information to account for local requirements or local circumstances.

In some cases, for some embodiments, rights holders may designate that a visible watermark should be included in the licensed media content. Accordingly, in some embodiments, licensing engines may be arranged to generate the visible watermark and overlay it into the media content. In some embodiments, licensing engines may be arranged to enable creators or rights holders to select from different types of visible watermarks or different placements. For example, for some embodiments, licensing engines may enable rights holders to require the visible watermark to include particular text, language (e.g., English, Spanish, or the like). QR Codes, bar codes, serial numbers, effective dates, or the like. Likewise, for example, rights holders or creators may indicate if the visible watermark should be placed in particular locations (e.g., the lower left corner, or the like) of a video or image.

At block 516, in one or more of the various embodiments, licensing engines may be arranged to update one or more licensing reports for the creators or rights holders. In some embodiments, media licensing platforms may be arranged to maintain accurate and accessible records regarding which protected content may be licensed for use in various media content. Accordingly, in some embodiments, licensing engines may be arranged to update these records based on the approved/agreed license to associate the security signature information, agreed license rules, watermarks, distribution plans, supplemental agreements, or the like, with the licensed media content.

At block 518, in one or more of the various embodiments, optionally, licensing engines may be arranged to forward the licensed media content to one or more distribution networks. In some embodiments, licensing engines may be arranged to enable creators and rights holders to designate one or more distribution networks that may automatically be provided the licensed media content. In some embodiments, one or more license rules may be associated with particular distribution networks or distribution methods. Accordingly, in some embodiments, creators may request particular license rules such that media content that may be compliant with those license rules may automatically be provided to distribution networks. In some embodiments, licensing engines may be arranged to provide user interfaces that enable creators to select from one or more approved distribution networks such that if the media content may be approved it may be automatically provided to those distribution networks.

In some embodiments, licensing engines may be arranged to enable rights holders to select which distribution networks may be eligible to distribute media content that includes their protected content. Also, in some embodiments, licensing engines may enable rights holders to exclude one or more distribution networks for individual media content even though the automatic rules may enable it.

Accordingly, in some embodiments, licensing engines may be arranged to employ one or more interfaces or APIs that enable the licensed media content to be provided to the relevant distribution networks. One of ordinary skill in the art, will appreciate the different distribution networks may requirement particular integration implementations. Accordingly, in some embodiments, licensing engines may be arranged to interface with particular distribution networks based on rules, instructions, libraries, or the like, that may be provided by configuration information to account for local requirements or local circumstances.

Note, this block is indicated as being optional because in some cases for some embodiments the licensing engines may be configured to omit this step such that the creator may determine how to distribute the licensed media content.

Next, in one or more of the various embodiments, control may be returned to a calling process.

Figure 6:
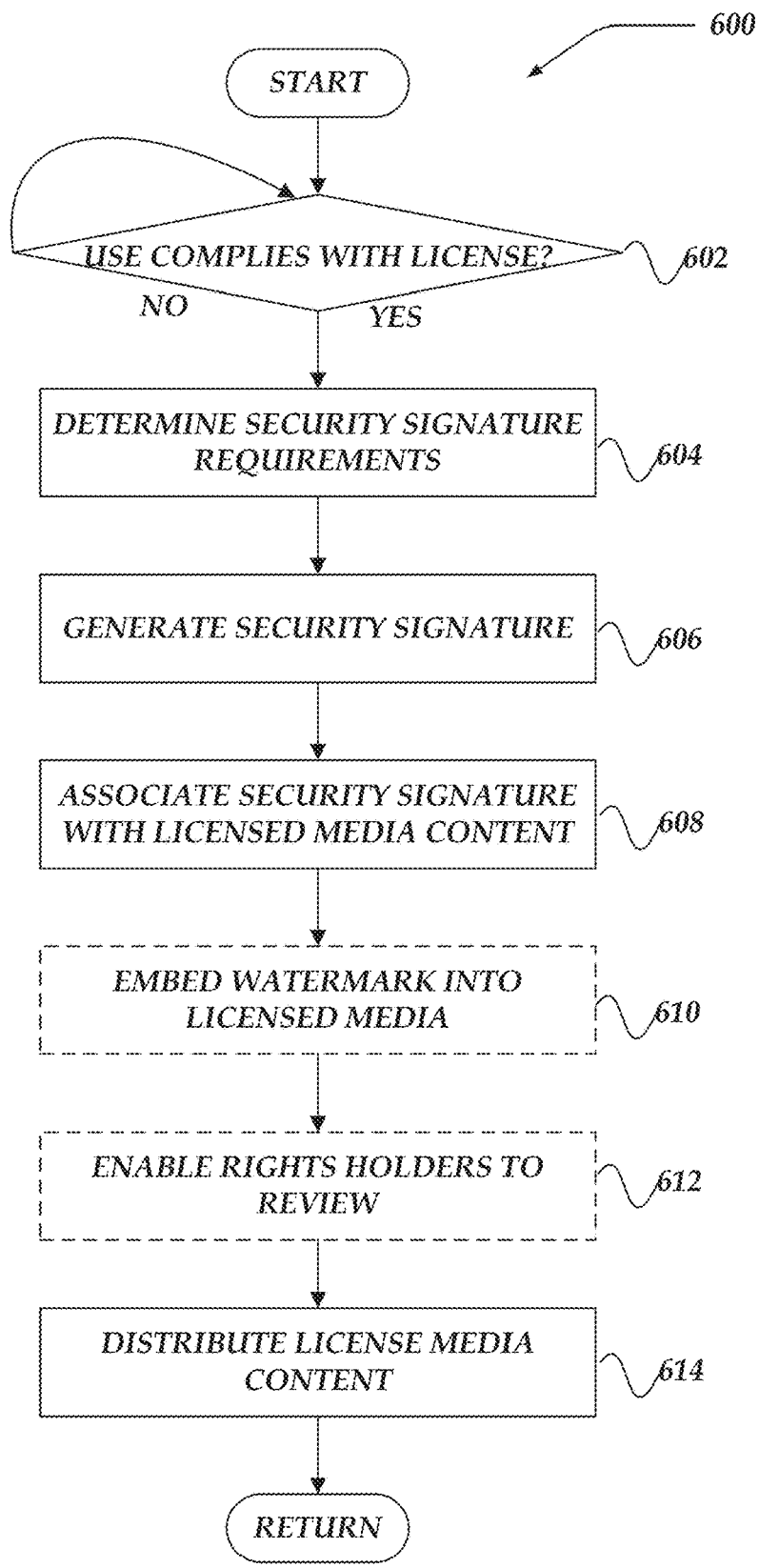
FIG. 6 illustrates a flowchart of a process for media licensing platforms in accordance with one or more of the various embodiments.

FIG. 6 illustrates a flowchart of process 600 for media licensing platforms in accordance with one or more of the various embodiments. After a start block, at decision block 602, in one or more of the various embodiments, if the use of the protected content included in submitted media complies with the one or more license rules associated with the protected content, control may flow to block 604; otherwise, control may loop back to decision block 602. As described above, in some embodiments, licensing engines may be arranged to enable interactive workflows that enable creators to submit media that may include protected content. Accordingly, in some embodiments, licensing engines may be arranged to automatically reject submitted media until it may be determined that submitted media complies with the license rules associated with protected content that may be included in the submitted media.

At block 604, in one or more of the various embodiments, licensing engines may be arranged to determine one or more security signature requirements that may be associated with the protected content. As described above, in some embodiments, different protected content or licensed media content may require different information included in security signatures or associated with security signatures. Also, in some embodiments, licensing engines may be arranged to enable some licensed media content formats (e.g., video, images, or the like) to include visible watermarks. Likewise, in some embodiments, different protected content may be configured to require different information to be shown in visible watermarks.

Accordingly, in some embodiments, license rules or other preference settings may declare the type of information to include security signatures or security signatures records. For example, in some embodiments, licensing engines may be arranged to enable rights holders to declare rules that require that a record of the final approving authority/agent be included in the security signature record. For example, in some embodiments, a security signature rule associated with some protected content may declare that a reference to or copy of a secure digital signature or other cryptographic "signing" evidence should be included in the security signature record. In contrast, for example, other protected content may be associated with security signature rules that omit such a requirement.

Also, in some embodiments, licensing engines may be arranged to enable rights holders to negotiate with creators regarding the visibility or appearance of security signature watermarks. For example, in some embodiments, licensing engines may be arranged to enable rights holders to configure license rules that require an increased licensing fee if the security signature watermark is not visible in the final licensed media content. In this example, the increased fee may be justified because the absence of a visible watermark (in some cases) may offer less security for the protected content. Similarly, in some embodiments, a creator may desire to hide the watermark for creative purposes and therefore may be willing to pay an increased license fee.

Also, in some embodiments, licensing engines may be arranged to enable creators or rights holders to negotiate one or more other watermark features, including, size, shape, positioning within the licensed media content, or the like. Accordingly, in some embodiments, security signature records may include information regarding these agreed upon features.

Further, in some embodiments, licensing engines may be arranged to enable rights holders to declare a minimum cryptographic strength of security signatures or security signature watermarks. In some cases, this may include key sizes, fingerprinting methods, particular hash digest functions, cryptographic protocols, or the like. Similar to other security signature/watermark features, licensing engines may be arranged to enable creators or rights holders to negotiate which security features may be required for a given licensed media content. For example, in some embodiments, rights holders may demand different levels of watermark/signature robustness for some protected content or uses of protected content than for others.

In some embodiments, licensing engines may be arranged to enable creators or rights holders to design custom watermark templates that may incorporate trade dress, branding, tag lines, colors, or the like, in watermarks. For example, in some embodiments, licensing engines may enable rights holders to design and designate a watermark template that uses particular color palettes, tag lines, or other imagery. Similarly, in some embodiments, licensing engines may enable creators to design one or more custom watermark templates for use in particular licensed media content.

Accordingly, in some embodiments, licensing engines may be arranged to enable rights holders to assign different licensing conditions or fees for different watermark templates. In some embodiments, licensing engines may be arranged to enable creators to upload or designate watermark templates via the creator gateway. Note, in some cases, protected content may be associated with one or more license rules that definitively exclude creator customized watermarks. Likewise, in some embodiments, one or more license rules may require particular watermark templates for particular protected content or uses of protected content.

At block 606, in one or more of the various embodiments, licensing engines may be arranged to generate the security signature in accordance with the one or more security signature requirements or the one or more license rules.

In some embodiments, licensing engines may be arranged to collect the information for the security signature. In some embodiments, in some cases, the security signature information may be collected automatically from a database. Also, in some embodiments, licensing engines may be arranged to facilitate or monitor an interactive workflow that may require collecting digital signatures, final confirmation, for the like. Also, in some embodiments, licensing engines may be arranged to employ one or more APIs that collect security signature information (e.g., cryptographic certificates, evidence of digital signatures, or the like) that may be included in security signature records.

In some embodiments, licensing engines may be arranged to generate hash digests or other digital fingerprints based on some or all of the licensed media content. In some embodiments, licensing engines may be arranged to enable security signatures to be adapted to different types of media. For example, security signatures for video content may be generated based on the video protocol such that particular video protocol frames, header fields, or the like, may be used for generating security signatures or embedding security signature information or watermarks with the licensed media content. For example, licensing engines may be configured to employ checksums, sequence numbers, or the like included in fields native to the protocol used for the media. Similarly, in some embodiments, various media protocols may include optional fields or user-custom fields that may be employed to store security signature information, such as serial numbers, hash digests, or the like directly in the media file or media stream.

At block 608, in one or more of the various embodiments, licensing engines may be arranged to associate the security signature with the license media content that includes the protected content.

In one or more of the various embodiments, licensing engines may be arranged to generate and store one or more security signature records that correspond to the security signature of the licensed media content. As described above, in some embodiments, in some cases, security signatures or watermarks may include limited information such as serial numbers that enable additional security signature information to be retrieved from a data store.

At block 610, in one or more of the various embodiments, optionally, licensing engines may be arranged to embed a watermark into the licensed media content.

In some embodiments, licensing engines may be arranged to process the candidate media content to embed the security signature as per the agreed license rules. In some embodiments, licensing engines may be arranged to employ rules, libraries, instructions, or the like provided via configuration information to determine some or all of the operations for embedding security signatures or their corresponding watermarks into licensed media content. Accordingly, in some embodiments, if additional media types, watermark types, media protocols, or the like, may be enabled, the appropriate instructions or libraries, or the like, may be employed.

Note, this block is indicated as being optional because in some cases the security signature requirements or the one or more license rules may declare that a watermark may be omitted from the licensed media content.

At block 612, in one or more of the various embodiments, optionally, licensing engines may be arranged to enable rights holders to review the licensed media content. In some embodiments, licensing engines may be arranged to enable rights holders to declare license rules that require a final rights holder approval before the licensed media content may be released to the creator or released to a distribution network. In some embodiments, in some cases, rights holders may require a final review to confirm that the watermark or other signature information may be represented to their satisfaction. For example, in some cases, for some protected content a rights holder may require a final review to confirm various security signature features, such as that a watermark may be visible, the watermark design meets brand requirements, review the security signature information that may be obtained from the watermark, or the like.

Note, this block is indicated as being optionally because in some cases for some embodiments the protected content may not be associated with a license rule that requires rights holders to review or approve security signature information or watermark appearance/placement.

At block 614, in one or more of the various embodiments, licensing engines may be arranged to distribute the licensed media content. In some embodiments, licensing engines may be arranged to distribute the licensed media content to one or more designated distribution networks. Also, in some embodiments, licensing engines may be arranged to distribute the licensed media content back to the creator such that the creator may "manually" distribute the licensed media content or provide the licensed media content to one or more distribution networks.

Next, in one or more of the various embodiments, control may be returned to a calling process.

Figure 7:
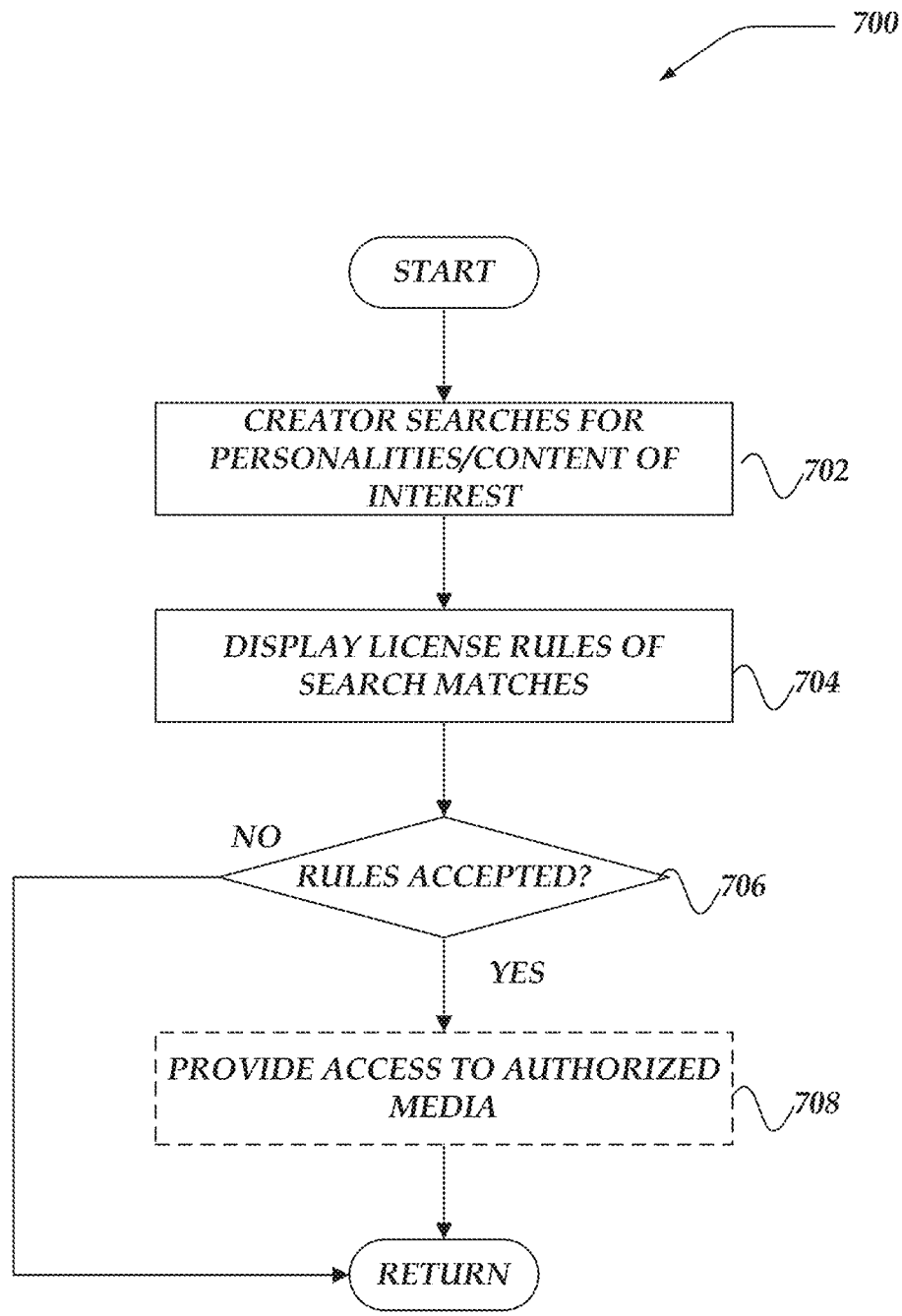
FIG. 7 illustrates a flowchart of a process for media licensing platforms in accordance with one or more of the various embodiments.

FIG. 7 illustrates a flowchart of process 700 for media licensing platforms in accordance with one or more of the various embodiments. After a start block, at block 702, in one or more of the various embodiments, licensing engines may be arranged to enable creators to search for personalities, brand content of interest, or other protected content.

In some embodiments, as described above, media licensing platforms may be arranged to provide creator gateways that enable media creators (or their agents) to interact with the media licensing platforms or licensing engines. In some embodiments, creator gateways may be applications that among other things provide various features including search facilities that enable users to identify the protected content that may be associated with media licensing platforms. Accordingly, in some embodiments, licensing engines may be arranged to be provided query information from the users via creator gateways.

In some embodiments, creator gateways may be arranged to provide user interfaces that enable query information, such as keywords, brand names, personality names, subject matter, or the like to be collected. Further, in some embodiments, creator gateways may enable users to set various filters, usage categories, media categories, license types, fee ranges, geographic locations, or the like, that may be employed to discover protected content that may be available licensing.

In some embodiments, creator gateways may be arranged to enable users to provide query information (including filters) that may be directed to license rules, licensing language, agreement/contract terms, or the like. Accordingly, in some embodiments, users may initiate protected content searches by identifying protected content that may meet their license requirements.

In some embodiments, creator gateways may include one or more user interfaces that enable natural text queries. Accordingly, in some embodiments, users of creator gateways may submit free form text that may be used for searching for protected content. In some embodiments, licensing engines may be arranged to employ generative artificial intelligence or large language models to process natural language text queries.

In some embodiments, media licensing platforms or licensing engines may be arranged to interface with external or third-party services for executing some or all portions of the queries. For example, in some embodiments, licensing engines may be arranged to interface with remote generative artificial intelligence services for processing or interpreting natural language text queries.

Also, in some embodiments, media licensing platforms or licensing engines may be arranged to determine the particular user interfaces, user interface fields, search/filter categories, user interface layouts, external interfaces, styling, exclusions or the like, based on instructions, templates, style sheets, or the like, provided via configuration information to account for local requirements or local circumstances.

At block 704, in one or more of the various embodiments, licensing engines may be arranged to display one or more license rules that may be associated with search matches. In some embodiments, creator gateways may be arranged to include user interfaces for displaying various interactive reports, including search results based on protected content searches.

In some embodiments, licensing engines may be arranged to exclude some search results based on the creator identity/category or rights holder preferences. In some cases, for some embodiments, one or more results may be excluded based on geographic location of the user initiating the search or the geographic location associated with the intended use of the protected content.

Also, in some embodiments, licensing engines may be arranged to determine the particular report format, report styling, or the like, based on instructions, templates, style sheets, or the like, provided via configuration information to account for local requirements or local circumstances.

In some embodiments, search reports generated by licensing engines may include (or enable access) to information about the license rules associated with listed protected content. For example, in some embodiments, a record in a search report may include a description of the protected content and a link (or other user interface control) that enables the license rules that correspond to that protected content to be displayed and reviewed by the user. Accordingly, in some embodiments, users may quickly determine if the license rules associated with protected content of interest may be compatible with the intended use of the protected content.

At decision block 706, in one or more of the various embodiments, if the creator determines that the one or more license rules are acceptable, control may flow to block 708; otherwise, control may be returned to a calling process.

Note, in some embodiments, one or more license rules listed for protected content may require additional interactions with rights holders. For example, in some cases, a listed use restriction license rule may be annotated with an indicator that notifies creators that the restriction may be negotiable in some cases. Accordingly, in some embodiments, accepting such a license rule may initiate further interactions between the rights holders and creators.

At block 708, in one or more of the various embodiments, optionally, licensing engines provide the creator access to authorized content for use in generating licensed media content.

In some embodiments, licensing engines may be arranged to enable rights holders to provide supplemental content that may be used as examples or for machine-learning training/model-development. In some embodiments, example content may be provided to generative AIs, large language models, or the like, for generating protected content based on or incorporating the example content. Further, in some embodiments, licensing engines may be arranged to enable rights holders to provide training data that includes protected content or supplemental protected content that may be used to train machine learning models, private/custom generative AIs, private/custom large language models, or the like. Accordingly, such trained models or AIs may be used by creators to generate media that includes protected content.

Further, in some embodiments, using the provided media may ensure that the machine-learning models, generative artificial intelligence models, or the licensed media content includes or is based on authorized/licensed source material.

In some embodiments, license rules associated with protected content may exclude the use of non-authorized training data or example data. Accordingly, in some embodiments, creators may use the provided authorized media to generate media that may include protected content. In contrast, using protected content examples from other open or public sources may expose the creators to license violations, copyright violations, trademark violations, or the like.

Alternatively, in some embodiments, license rules may include agreeing to a declaration, disclaimer, indemnification clause, or the like, if non-authorized protected content examples may be used as part of media generation or machine-learning model training.

Note, this block is indicated as being optional because in some cases for some embodiments authorized media may be unavailable for some subjects or protected content.

Next, in one or more of the various embodiments, control may be returned to a calling process.

Figure 8:
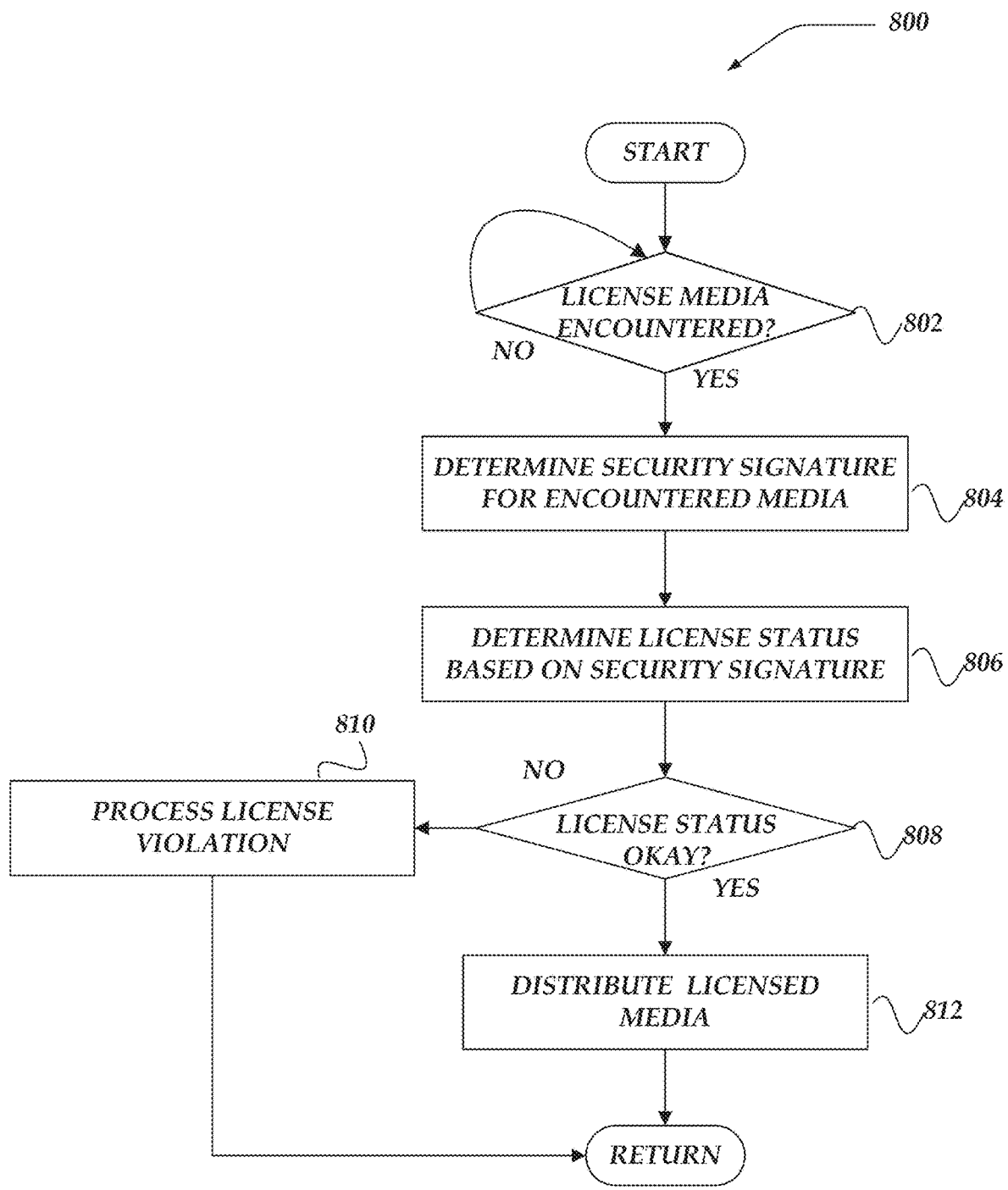
FIG. 8 illustrates a flowchart of a process for media licensing platforms in accordance with one or more of the various embodiments.

FIG. 8 illustrates a flowchart of process 800 for media licensing platforms in accordance with one or more of the various embodiments. After a start block, at decision block 802, in one or more of the various embodiments, if a distribution network encounters licensed media content, control may flow to block 804; otherwise, control may loop back to decision block 802.

As described above, in some cases, licensed media content may be distributed using one or more third-party distribution networks. In some embodiments, licensing engines may be arranged to provide interfaces, libraries, or APIs that enable distribution networks to determine if media in their system may be licensed media content.

In some embodiments, one or more services that may be external to the distribution network itself may be arranged to sample media provided by the distribution networks to determine if the distributed media may be licensed media content. In some cases, for some embodiments, licensing engines may be configured to sample media from various distribution networks to monitor for unauthorized use of protected content.

In some embodiments, various methods for determining licensed media content may include determining identifiers associated with the licensed media content based on the media title, media file name, media identifiers included in media protocol header fields, exchangeable image file format (EXIF) information, or the like.

In some embodiments, licensing engines may be arranged to provide one or more of interfaces, APIs, or libraries that enable distribution networks to determine if there may be security signatures or watermarks in encountered media. In some embodiments, licensing engines may be arranged to execute various operations, such as frequency domain analysis, machine-learning classifications, statistical analysis, contrast analysis, image forensics, or the like. Accordingly, in some embodiments, licensing engines may be arranged to employ one or more heuristics to identify or extract security signature or watermark information from licensed media content. One of ordinary skill in the art will appreciate that security signature methods or watermarking methods may adapt as new techniques may be developed. Likewise, in some embodiments, security signature methods or watermarking may adapt to different media protocols including newly approved standards or custom protocols. Accordingly, in some embodiments, licensing engines may be arranged to employ heuristics, instructions, rules, libraries, or the like, provided via configuration information to account for local requirements for determining security signatures or watermarks from media.

In some embodiments, licensing engines may be arranged to provide interfaces, APIs, or libraries that enable distribution networks to determine analytically if media may be licensed media content. For example, in some embodiments, a library may be provided that enables distribution networks to locally conduct one or more validation tests (e.g., Luhn algorithm variants) that may be used to evaluate media content.

At block 804, in one or more of the various embodiments, licensing engines may be arranged to determine a security signature for the licensed media content.

In one or more of the various embodiments, licensing engines may be arranged to provide one or more interfaces or APIs that enable distribution networks to submit some or all security signature information to the licensing engines. Accordingly, in some embodiments, licensing engines may determine if the media content may be associated with valid licenses. In some embodiments, licensing engines may be arranged to enable distribution networks to submit various kinds or security signature information, such as, serial numbers, hash digests, media sizes, upload/view date information, sponsor information (e.g., which distribution network user is playing the media), or the like. In some embodiments, licensing engines may be interactive such that the licensing engines may automatically request additional information that may be used to confirm or strength its determination. For example, in some cases, licensing engines may be configured to request a particular sample of the media to confirm a license determination. For example, in some embodiments, if a serial number associated with a video is provided, the licensing engines may request a sample of video from a particular portion (e.g., timestamp, page, frame, or the like) to further evaluate whether the media may be correctly licensed. Also, in some embodiments, licensing engines interface may enable security signature information, such as serial numbers to be accompanied with a portion of the media content under evaluation.

At block 806, in one or more of the various embodiments, licensing engines may be arranged to determine a status of the license based on the security signature.

In some embodiments, licensing engines may be arranged to employ the information provided by the distribution networks to lookup the security signature records that may be associated with the licensed media content. For example, in some embodiments, if the distribution networks submit a serial number the licensing engines may employ the serial number to retrieve security signature records from its license information data store.

At decision block 808, if the license status is valid, control may flow to block 812; otherwise, control may flow to block 810.

At block 810, in one or more of the various embodiments, the distribution network may be enabled to process the license violation.

In some embodiments, distribution networks may have their own internal processes for handling media with invalid licenses. For example, some distribution networks may automatically suspend the distribution of unlicensed media. In other cases, distribution networks may include notices or warnings reporting to viewers that the media may be unlicensed. In some embodiments, licensing engines may provide interfaces or APIs that enable distribution networks to obtain instructions on how to handle media with invalid licenses. For example, in some embodiments, rights holders may employ the rights holder gateway of a media licensing platform to assign how unlicensed/invalid uses of their protected content may be enforced or otherwise processed. For example, in some embodiments, rights holders may be request that media that include unauthorized uses of protected content be demonetized, suppressed, removed from the distribution network, diverting earnings associated with unlicensed media to the rights holders, or the like. In some embodiments, licensing engines may collect records of license violations to enable rights holders to take further action outside of the facilities provided by the distribution networks.

Next, in one or more of the various embodiments, control may be returned to a calling process.

At block 812, in one or more of the various embodiments, the distribution network may be enabled to distribute the licensed media content. In some embodiments, since the license associated with the media may be validated, the distribution network may distribute the media as normal.

Next, in one or more of the various embodiments, control may be returned to a calling process.

Figure 9:
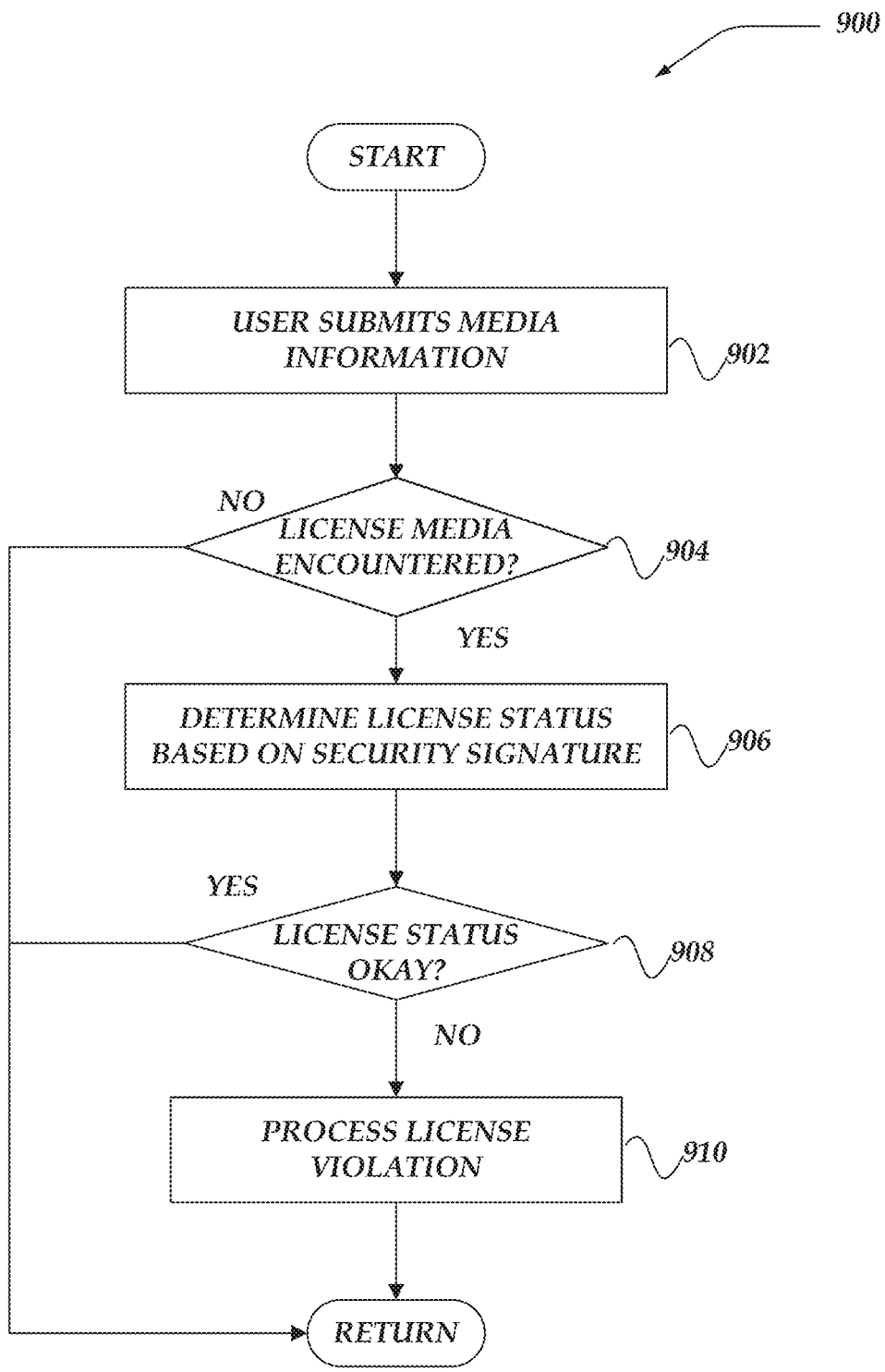
FIG. 9 illustrates a flowchart of a process for media licensing platforms in accordance with one or more of the various embodiments.

FIG. 9 illustrates a flowchart of process 900 for media licensing platforms in accordance with one or more of the various embodiments. After a start block, at block 902, in one or more of the various embodiments, media licensing platforms may be arranged to enable users to submit media content or information about media content. In some embodiments, media licensing platforms may provide user gateways that enable media users (e.g., the general public) to submit information about media content to media licensing platforms. Accordingly, in some embodiments, users may be enabled to determine if the media content they are consuming may be licensed media content or otherwise is being presented in an authorized use.

Accordingly, in some embodiments, licensing engines may be arranged to provide user interfaces that enable users to upload one or more portions of the media content they are using.

Accordingly, in some embodiments, licensing engines may be arranged to enable users to upload media files, screenshots, or the like. Also, in some embodiments, licensing engines may be arranged to enable users to provide a link or other reference to the media such that the licensing engines may upload or sample the media based on the link/reference.

Further, in some embodiments, licensing engines may be arranged to provide user interfaces that enable users to provide security signature information such as serial numbers, or the like, that may be obtained from visible watermarks, EXIF data, or the like.

At decision block 904, in one or more of the various embodiments, if licensed media content may be determined, control may flow to block 906; otherwise, control may be returned to a calling process. In some embodiments, licensing engines may be arranged to determine licensed media content based on security signature information that may be included in the submitted media or provided by the user. In some embodiments, as described above, licensing engines may be arranged to determine or extract security signature information from the submitted or collected media samples. Also, in some embodiments, users may provide security signature serial numbers that may be visible in watermarks or included in EXIF information associated with the media content.

At block 906, in one or more of the various embodiments, licensing engines may be arranged to determine the license status of the media content. In some embodiments, licensing engines may lookup one or more security signature records based on security signature information extracted from the uploaded media or based on serial number information provided by the user.

In some embodiments, licensing engines may be arranged to generate an interactive report that shows the license information associated with the media of interest. In some embodiments, licensing engines may display a sample or thumbnail of the licensed media content to enable users to compare the media they are using with the media that is associated with the license. Accordingly, in some embodiments, users may confirm if the media they are using corresponds to the license information.

At decision block 908, in some embodiments, if the license status is okay, control may be returned to a calling process; otherwise, control may flow to block 910. In some embodiments, license status may be determined based on evaluating the current date, usage (e.g., image v. video), correspondence between security signature information and media content, or the like.

As mentioned above, in some embodiments, licensing engines may enable users to visually confirm that the licensed media content associated with the security signature information matches the media that the user may be viewing. Note, in some cases, the media content may be audio media such that users may be enabled to play a portion of the licensed media content to confirm that correspondence between the security signature information and the media of interest.

At block 910, in one or more of the various embodiments, licensing engines may be arranged to process the license violation.

In some embodiments, licensing engines may be arranged to rights holders to elected from one or more actions to take if invalid or unauthorized media uses are discovered. Accordingly, in some embodiments, licensing engines may be arranged to enable one or more actions, such as, immediate notification, accumulate information for a later generated report, or the like.

In some embodiments, licensing engines may be arranged to provide a warning notice to the user that indicates that the media content of interest may not be licensed media content.

Next, in one or more of the various embodiments, control may be returned to a calling process.

Figure 10:
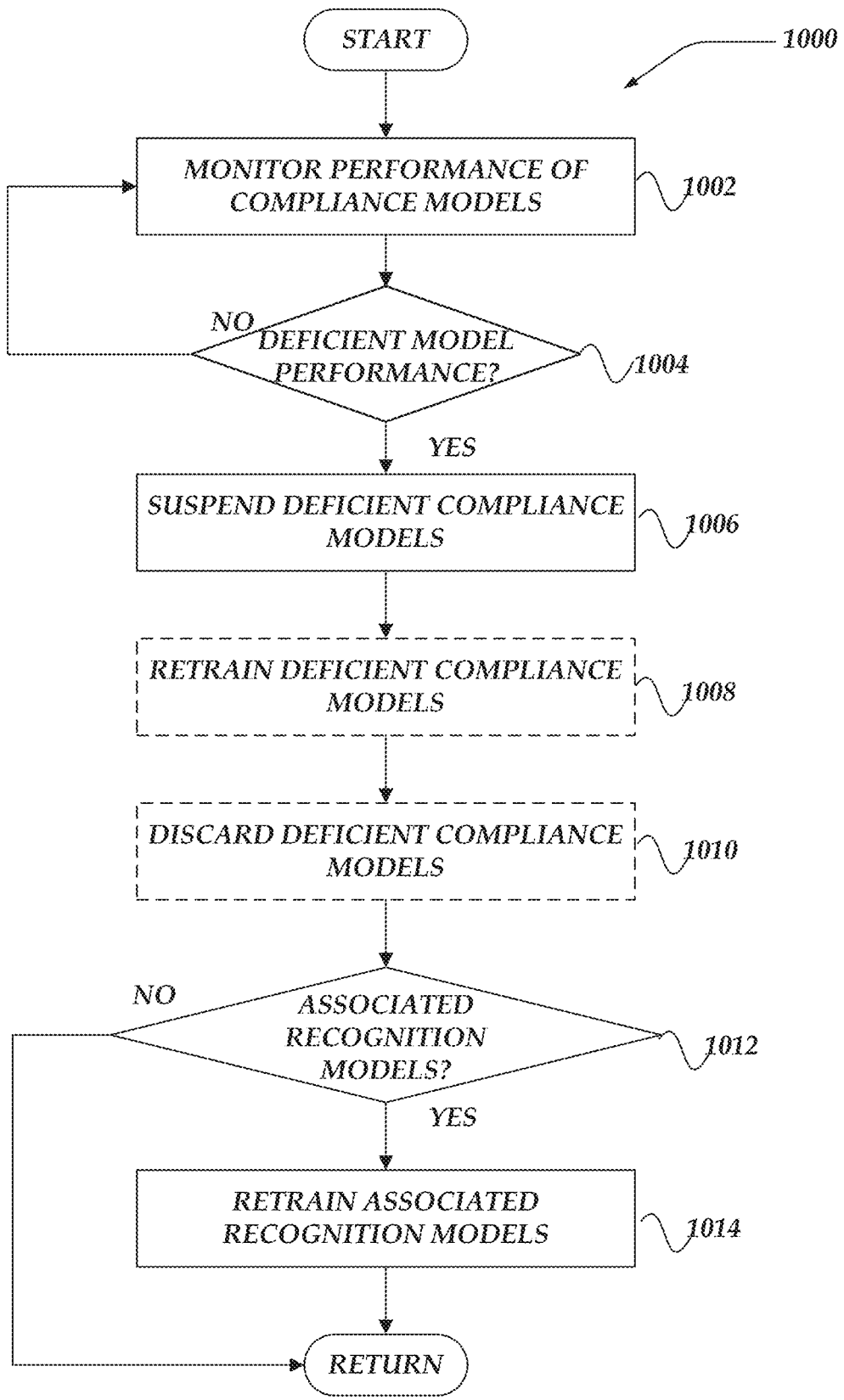
FIG. 10 illustrates a flowchart of a process for media licensing platforms in accordance with one or more of the various embodiments.

FIG. 10 illustrates a flowchart of process 1000 for media licensing platforms in accordance with one or more of the various embodiments. After a start block, at block 1002, in one or more of the various embodiments, licensing engines may be arranged to monitor the performance of one or more compliance models. As mentioned above, in some embodiments, licensing engines may be arranged to collect one or more metrics associated with the performance of compliance models.

In some embodiments, licensing engines may be arranged to monitor the performance of compliance models to account for model skew that may occur as the corpus of source/training data evolves. Likewise, in some embodiments, the usages or features of media content may evolve as well as new content generation tools or methods may be developed. Accordingly, in some embodiments, licensing engines may be arranged to actively or passively one or more interactions to periodically or continuously evaluate the performance or suitability of compliance models.

In some embodiments, licensing engines may be arranged to monitor if rights holders may be in agreement with one or more license rules recommended by licensing engines. Also, in some embodiments, licensing engines may be arranged to monitor if creators or rights holders may be in agreement with automatic protected content identification or determination generated based on the one or more compliance models. For example, in some embodiments, licensing engines may be arranged to collect metrics if media content may be incorrectly flagged for including non-compliant content or usages. Similarly, in some embodiments, licensing engines may be arranged to collect metrics if one or more compliance models fail to detect non-complaint uses of protected content.

In some embodiments, licensing engines may be arranged to display user interfaces that enable creators or rights holders to indicate disagreement or satisfaction with predictions or inferences may be compliance models. Accordingly, in some embodiments, licensing engines may be arranged to collect metrics for one or more compliance models that are associated with creators or rights holders engagement with the compliance models.

Also, in some embodiments, licensing engines may be arranged to provide user interfaces that enable users (e.g., consumers rather than creators or rights holders) to provide similar feedback that may be collected for evaluating compliance models.

In some embodiments, licensing engines may be arranged to passively monitor user, creator, or rights holder behavior the collect other metrics that may indicate if compliance models may be deficient. For example, compliance models determinations that have their determinations overridden by rights holders may be selected for retraining if the number of overrides exceeds a threshold value. For example, a deficient compliance model may flag media content as non-compliant but later appeals by creators to rights holders may discover that the associated compliance model is incorrectly flagging compliant uses as non-compliant.

Also, in some embodiments, licensing engines may be arranged to compare compliance inferences or predictions of two or more competing compliance models such that if the discrepancies in their predictions of non-compliance or compliance exceed an error range or threshold value, one or all the low-scoring or out-of-range compliance models may be flagged as deficient.

Also, in some embodiments, licensing engines may be arranged to include test media content that is known to include content that should trigger one or more compliance models to signal that there may be non-compliance or compliance with one or more license rules. Accordingly, in some embodiments, licensing engines may be arranged to automatically run one or more compliance models against test media content to confirm that the relevant compliance models are making correct determinations regarding compliance with license rules.

In some embodiments, licensing engines may be arranged to employ rules, libraries, instructions, or the like provided or augmented via configuration information to evaluate compliance models. Accordingly, in some embodiments, licensing engines may be arranged to be adaptable to various media content generation methods, media types, different kinds of license rules, different compliance thresholds, or the like.

At decision block 1004, in one or more of the various embodiments, if one or more compliance models exhibit deficient performance, control may flow to block 1006; otherwise, control may loop back to block 1002 for continued monitoring.

In one or more of the various embodiments, licensing engines may be arranged to be configured with one or more default threshold values associated with various performance metrics. In some embodiments, licensing engines may be arranged to enable rights holders or media licensing platform operators to customize one or more metrics or threshold values.

At block 1006, in one or more of the various embodiments, licensing engines may be arranged to suspend the use of the deficient compliance models. In some embodiments, licensing engines may be arranged to flag deficient compliance models such that they may be omitted from use. In some embodiments, suspending a compliance model may effectively disable one or more associated license rules. Accordingly, in some embodiments, licensing engines may be arranged to include information in compliance reports, or the like that clearly indicate the disabled license rules have not been considered or evaluated. Accordingly, in some embodiments, rights holders and creators may be made aware that one or more license rules are not being automatically considered. Thus, in some embodiments, licensing engines may enable the rights holders or creators to conduct additional review (e.g., manual review) of the media content for the disabled license rules.

Also, in some embodiments, licensing engines may enable media licensing platform operators or in some cases rights holders to reactivate suspended compliance models returning them to service. In some embodiments, manually returning a compliance model to service may include resetting its performance metrics.

At block 1008, in one or more of the various embodiments, optionally, licensing engines may be arranged to retrain the one or more deficient compliance models.

In some embodiments, licensing engines may be arranged to submit suspended compliance models to retraining. Accordingly, in some embodiments, the existing suspended compliance model may be automatically retrained with current training data. In some embodiments, media licensing platforms may be configured to retrain deficient compliance model offline using a mix of automated or assisted training methods.

Note, this block is indicated as being optional because in some cases for some embodiments licensing engines may be configured to discard deficient compliance models rather than retraining them.

At block 1010, in one or more of the various embodiments, optionally, licensing engines may be arranged to discard the one or more deficient compliance models.

In some embodiments, rather than trying to retrain or otherwise rehabilitate deficient compliance models, licensing engines may be arranged to discard deficient compliance models.

Note, this block is indicated as being optional because in some cases for some embodiments licensing engines may be configured to discard deficient compliance models rather than retraining them. Likewise, in some cases, the retraining of a deficient compliance model may produce results that are not performing sufficiently for reinstatement or otherwise use in production.

At decision block 1012, in one or more of the various embodiments, if the one or more deficient compliance models are associated with one or more recognition models, control may flow to block 1014; otherwise, control may be returned to a calling process.

At block 1014, in one or more of the various embodiments, licensing engines may be arranged to retrain some or all of the associated recognition models. As described above, in some embodiments, some recognition models may be associated with particular compliance models.

In one or more of the various embodiments, licensing engines may be arranged to employ evaluations or monitoring associated with one or more compliance models to retrain one or more associated recognition models. Accordingly, in some embodiments, as compliance models are corrected or improved, licensing engines may employ information or metrics associated with the deficient compliance models to direct the automatic retraining of associated recognition models. In some embodiments, licensing engines may be arranged to reevaluate retrained recognition models using original or retrained compliance models to confirm that deficiencies in the recognition models may be corrected. For example, in some embodiments, if a compliance model determined that protected content was being missed or misclassified by a recognition model, licensing engines may be arranged to re-run the same or retrained compliance models against the protected content identified by a retrained recognition model to evaluate if the retrained recognition model may be corrected.

Accordingly, in some embodiments, if one or more compliance models associated with one or more recognition models may be determined to be deficient, the associated one or more recognition models may be considered deficient. Thus, in some embodiments, licensing engines may be arranged to automatically retrain these deficient recognition models based on their association with deficient compliance models.

Also, in some embodiments, licensing engines may be arranged to determine the training assets that may be associated with recognition models designated for retraining. In some embodiments, licensing engines may be arranged to update these training data using additional authorized training assets provided by rights holders. For example, in some embodiments, licensing engines may provide one or more APIs or interfaces that enable rights holders to continuously or periodically upload authorized training assets for facial recognition of particular personalities. Thus, in some embodiments, licensing engines may be arranged to retrain the associated recognition models using the updated authorized assets.

Next, in one or more of the various embodiments, control may be returned to a calling process.

Note, in some embodiments, while process 1000 describes automated quality assurance for compliance models licensing engines may be arranged to include similar process for evaluating recognition models. Likewise, in some embodiments, licensing engines may be arranged to enable experimental compliance models or experimental recognition models to be executed along-side production compliance models or production recognition models. Accordingly, in some embodiments, the performance of experimental models may be compared to in-production models. Thus, in some embodiments, if experimental models perform at or above standard, they may be moved into production use.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of these innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing media licenses in a network using one or more processors to execute instructions that are configured to cause actions, comprising:
   training one or more recognition models to classify media content into one or more portions as protected content or as non-protected content;
   training one or more of a plurality of compliance models based on the one or more recognition models, wherein the one or more compliance models are used to evaluate the media content based on one or more licensing rules for the one or more portions of the protected content; and
   in response to a determination that the one or more recognition models misclassified one or more portions of the media content as protected content or as non-protected content, employing one or more licensing engines to use one or more results of the evaluation to perform further actions, including:
      identifying the one or more classified portions of the media content that are non-compliant with the one or more licensing rules;
      retraining the one or more recognition models based on reclassification of the one or more identified portions of media content and training assets authorized by one or more of a creator or a rights holder of the media content; and
      retraining the one or more compliance models based on metrics associated with media content and the one or more retrained recognition models, wherein the one or more retrained compliance models are used to reevaluate the media content for compliance with the one or more licensing rules; and
   granting a media license authorized by one or more of the creator or the rights holder to the one or more portions of the media content that are evaluated to be both compliant with the one or more licensing rules and classified as protected content.

2. The method of claim 1, further comprising:
   approving the media content based on compliance with the one or more licensing rules;
   generating security signature information based on one or more characteristics of the media content; and embedding the security signature information in the media content based on the one or more licensing rules.

3. The method of claim 1, further comprising:
determining one or more distribution networks associated with the licensed media content;
providing the licensed media content to the one or more distribution networks; and
monitoring usage of the licensed media content within the one or more distribution networks.

4. The method of claim 1, further comprising:
determining query information based on creator interactions with a creator gateway;
employing the query information to search for other protected content based on the query information; and
generating an interactive report that displays the other protected content and one or more other licensing rules that may be associated with the other protected content.

5. The method of claim 1, further comprising:
determining one or more collections of authorized media assets that are associated with the protected content; and
enabling creators to access the one or more collections of authorized media assets.

6. The method of claim 1, further comprising:
determining the one or more metrics associated with the one or more compliance models, wherein the one or more metrics include a number of times the one or more rights holders indicate disagreement with one or more compliance predictions made by a compliance model; and
determining the portion of the one or more compliance models for retraining based on the one or more metrics, wherein the portion of the one or more compliance models determined for retraining are associated with the one or more metrics that are below a threshold value.

7. The method of claim 1, further comprising:
determining security signature information associated with the media content, wherein the security signature information is provided by one or more of a user, a distribution network, the creator, or the rights holder;
determining one or more security signature records based on the security signature information;
validating that the determined security signature information corresponds to the one or more security signature records; and
generating one or more reports based on one or more results of the validation, wherein the one or more reports are provided to one or more of the user, the creator, the distribution network, or the rights holder.

8. The method of claim 1, wherein retraining the one or more compliance models, further comprises:
determining one or more deficiencies in the one or more compliance models based on the one more metrics;
determining a portion of the one or more recognition models that are associated with the one or more deficiencies;
retraining the portion of one or more recognition models based on one or more of the one or more compliance models or the one or more retrained compliance models.

9. A network computer for managing media licenses, comprising:
a memory that stores at least instructions; and
one or more processors that execute instructions that are configured to cause actions, including:
training one or more recognition models to classify media content into one or more portions as protected content or as non-protected content;
training one or more of a plurality of compliance models based on the one or more recognition models, wherein the one or more compliance models are used to evaluate the media content based on one or more licensing rules for the one or more portions of the protected content; and
in response to a determination that the one or more recognition models misclassified one or more portions of the media content as protected content or as non-protected content, employing one or more licensing engines to use one or more results of the evaluation to perform further actions, including:
identifying the one or more classified portions of the media content that are non-compliant with the one or more licensing rules;
retraining the one or more recognition models based on reclassification of the one or more identified portions of media content and training assets authorized by one or more of a creator or a rights holder of the media content; and
retraining the one or more compliance models based on metrics associated with media content and the one or more retrained recognition models, wherein the one or more retrained compliance models are used to reevaluate the media content for compliance with the one or more licensing rules; and
granting a media license authorized by one or more of the creator or the rights holder to the one or more portions of the media content that are evaluated to be both compliant with the one or more licensing rules and classified as protected content.

10. The network computer of claim 9, wherein the one or more processors execute instructions that are configured to cause actions, further comprising:
approving the media content based on compliance with the one or more licensing rules;
generating security signature information based on one or more characteristics of the media content; and
embedding the security signature information in the media content based on the one or more licensing rules.

11. The network computer of claim 9, wherein the one or more processors execute instructions that are configured to cause actions, further comprising:
determining one or more distribution networks associated with the licensed media content;
providing the licensed media content to the one or more distribution networks; and
monitoring usage of the licensed media content within the one or more distribution networks.

12. The network computer of claim 9, wherein the one or more processors execute instructions that are configured to cause actions, further comprising:
determining query information based on creator interactions with a creator gateway;
employing the query information to search for other protected content based on the query information; and
generating an interactive report that displays the other protected content and one or more other licensing rules that may be associated with the other protected content.

13. The network computer of claim 9, wherein the one or more processors execute instructions that are configured to cause actions, further comprising:

determining one or more collections of authorized media assets that are associated with the protected content; and enabling creators to access the one or more collections of authorized media assets.

14. The network computer of claim 9, wherein the one or more processors execute instructions that are configured to cause actions, further comprising:

determining the one or more metrics associated with the one or more compliance models, wherein the one or more metrics include a number of times the one or more rights holders indicate disagreement with one or more compliance predictions made by a compliance model; and determining the portion of the one or more compliance models for retraining based on the one or more metrics, wherein the portion of the one or more compliance models determined for retraining are associated with the one or more metrics that are below a threshold value.

15. The network computer of claim 9, wherein the one or more processors execute instructions that are configured to cause actions, further comprising:

determining security signature information associated with the media content, wherein the security signature information is provided by one or more of a user, a distribution network, the creator, or the rights holder;

determining one or more security signature records based on the security signature information;

validating that the determined security signature information corresponds to the one or more security signature records; and generating one or more reports based on one or more results of the validation, wherein the one or more reports are provided to one or more of the user, the creator, the distribution network, or the rights holder.

16. A processor readable non-transitory storage media that includes instructions configured for managing media licenses, wherein execution of the instructions by one or more processors on one or more network computers performs actions, comprising:

training one or more recognition models to classify media content into one or more portions as protected content or as non-protected content;

training one or more of a plurality of compliance models based on the one or more recognition models, wherein the one or more compliance models are used to evaluate the media content based on one or more licensing rules for the one or more portions of the protected content; and in response to a determination that the one or more recognition models misclassified one or more portions of the media content as protected content or as non-protected content, employing one or more licensing engines to use one or more results of the evaluation to perform further actions, including:

identifying the one or more classified portions of the media content that are non-compliant with the one or more licensing rules;

retraining the one or more recognition models based on reclassification of the one or more identified portions of media content and training assets authorized by one or more of a creator or a rights holder of the media content; and retraining the one or more compliance models based on metrics associated with media content and the one or more retrained recognition models, wherein the one or more retrained compliance models are used to reevaluate the media content for compliance with the one or more licensing rules; and granting a media license authorized by one or more of the creator or the rights holder to the one or more portions of the media content that are evaluated to be both compliant with the one or more licensing rules and classified as protected content.

17. The storage media of claim 16, further comprising:

approving the media content based on compliance with the one or more licensing rules;

generating security signature information based on one or more characteristics of the media content; and embedding the security signature information in the media content based on the one or more licensing rules.

18. The storage media of claim 16, further comprising:

determining one or more distribution networks associated with the licensed media content;

providing the licensed media content to the one or more distribution networks; and monitoring usage of the licensed media content within the one or more distribution networks.

19. The storage media of claim 16, further comprising:

determining query information based on creator interactions with a creator gateway;

employing the query information to search for other protected content based on the query information; and generating an interactive report that displays the other protected content and one or more other licensing rules that may be associated with the other protected content.

20. The storage media of claim 16, further comprising:

determining one or more collections of authorized media assets that are associated with the protected content; and enabling creators to access the one or more collections of authorized media assets.

21. The storage media of claim 16, further comprising:

determining the one or more metrics associated with the one or more compliance models, wherein the one or more metrics include a number of times the one or more rights holders indicate disagreement with one or more compliance predictions made by a compliance model; and determining the portion of the one or more compliance models for retraining based on the one or more metrics, wherein the portion of the one or more compliance models determined for retraining are associated with the one or more metrics that are below a threshold value.

22. The storage media of claim 16, further comprising:

determining security signature information associated with the media content, wherein the security signature information is provided by one or more of a user, a distribution network, the creator, or the rights holder;

determining one or more security signature records based on the security signature information;

validating that the determined security signature information corresponds to the one or more security signature records; and generating one or more reports based on one or more results of the validation, wherein the one or more reports are provided to one or more of the user, the creator, the distribution network, or the rights holder.

23. A system for managing media licenses in a computing environment:

one or more network computers, comprising:
a memory that stores at least instructions; and one or more processors that execute instructions that are configured to cause actions, including:
  training one or more recognition models to classify media content into one or more portions as protected content or as non-protected content;
  training one or more of a plurality of compliance models based on the one or more recognition models, wherein the one or more compliance models are used to evaluate the media content based on one or more licensing rules for the one or more portions of the protected content; and
  in response to a determination that the one or more recognition models misclassified one or more portions of the media content as protected content or as non-protected content, employing one or more licensing engines to use one or more results of the evaluation to perform further actions, including:
    identifying the one or more classified portions of the media content that are non-compliant with the one or more licensing rules;
    retraining the one or more recognition models based on reclassification of the one or more identified portions of media content and training assets authorized by one or more of a creator or a rights holder of the media content; and
    retraining the one or more compliance models based on metrics associated with media content and the one or more retrained recognition models, wherein the one or more retrained compliance models are used to reevaluate the media content for compliance with the one or more licensing rules; and
    granting a media license authorized by one or more of the creator or the rights holder to the one or more portions of the media content that are evaluated to be both compliant with the one or more licensing rules and classified as protected content; and
one or more client computers, comprising:
  a memory that stores at least instructions; and
  one or more processors that execute instructions that are configured to cause actions, including:
    providing the media content.

24. The system of claim 23, wherein the one or more processors of the one or more network computers execute instructions that are configured to cause actions, further comprising:
  approving the media content based on compliance with the one or more licensing rules;
  generating security signature information based on one or more characteristics of the media content; and
  embedding the security signature information in the media content based on the one or more licensing rules.

25. The system of claim 23, wherein the one or more processors of the one or more network computers execute instructions that are configured to cause actions, further comprising:
  determining one or more distribution networks associated with the licensed media content;
  providing the licensed media content to the one or more distribution networks; and
  monitoring usage of the licensed media content within the one or more distribution networks.

26. The system of claim 23, wherein the one or more processors of the one or more network computers execute instructions that are configured to cause actions, further comprising:
  determining query information based on creator interactions with a creator gateway;
  employing the query information to search for other protected content based on the query information; and
  generating an interactive report that displays the other protected content and one or more other licensing rules that may be associated with the other protected content.

27. The system of claim 23, wherein the one or more processors of the one or more network computers execute instructions that are configured to cause actions, further comprising:
  determining one or more collections of authorized media assets that are associated with the protected content; and
  enabling creators to access the one or more collections of authorized media assets.

28. The system of claim 23, wherein the one or more processors of the one or more network computers execute instructions that are configured to cause actions, further comprising:
  determining the one or more metrics associated with the one or more compliance models, wherein the one or more metrics include a number of times the one or more rights holders indicate disagreement with one or more compliance predictions made by a compliance model; and
  determining the portion of the one or more compliance models for retraining based on the one or more metrics, wherein the portion of the one or more compliance models determined for retraining are associated with the one or more metrics that are below a threshold value.

29. The system of claim 23, wherein the one or more processors of the one or more network computers execute instructions that are configured to cause actions, further comprising:
  determining security signature information associated with the media content, wherein the security signature information is provided by one or more of a user, a distribution network, the creator, or the rights holder;
  determining one or more security signature records based on the security signature information;
  validating that the determined security signature information corresponds to the one or more security signature records; and
  generating one or more reports based on one or more results of the validation, wherein the one or more reports are provided to one or more of the user, the creator, the distribution network, or the rights holder.

30. The system of claim 23, wherein retraining the one or more compliance models, further comprises:
  determining one or more deficiencies in the one or more compliance models based on the one more metrics;
  determining a portion of the one or more recognition models that are associated with the one or more deficiencies;
  retraining the portion of one or more recognition models based on one or more of the one or more compliance models or the one or more retrained compliance models.

* * * * *

UNITED STATES PATENT AND TRADEMARK OFFICE
CERTIFICATE OF CORRECTION

PATENT NO. : 12,094,020 B1
APPLICATION NO. : 18/413616
DATED : September 17, 2024
INVENTOR(S) : Glenn Alan Morten Page 1 of 1

It is certified that error appears in the above-identified patent and that said Letters Patent is hereby corrected as shown below:

In the Claims

In Column 39, Line 55, in Claim 8, delete "one" and insert -- one or --, therefor.

In Column 44, Line 56, in Claim 30, delete "one" and insert -- one or --, therefor.

Signed and Sealed this
Twenty-ninth Day of April, 2025

Coke Morgan Stewart
*Acting Director of the United States Patent and Trademark Office*